United States Patent
Oikawa

(10) Patent No.: US 8,920,228 B2
(45) Date of Patent: Dec. 30, 2014

(54) MULTIGAME RANKING WITH VIRTUAL ITEM REWARDS

(71) Applicant: gloops, Inc., Tokyo (JP)

(72) Inventor: Takahide Oikawa, Tokyo (JP)

(73) Assignee: gloops, Inc., Tokyo (JP)

( * ) Notice: Subject to any disclaimer, the term of this patent is extended or adjusted under 35 U.S.C. 154(b) by 0 days.

(21) Appl. No.: 14/189,968

(22) Filed: Feb. 25, 2014

(65) Prior Publication Data

US 2014/0243088 A1    Aug. 28, 2014

(30) Foreign Application Priority Data

Feb. 25, 2013 (JP) ................................ 2013-035157

(51) Int. Cl.
*A63F 9/24* (2006.01)
*A63F 13/30* (2014.01)

(52) U.S. Cl.
CPC ............ *A63F 13/12* (2013.01); *A63F 2300/609* (2013.01); *A63F 2300/558* (2013.01)
USPC .................................... 463/7; 463/42

(58) Field of Classification Search
CPC .............. A63F 13/12; A63F 2300/558; A63F 2300/609
See application file for complete search history.

(56) References Cited

U.S. PATENT DOCUMENTS

| | | |
|---|---|---|
| 2003/0228908 A1 | 12/2003 | Caiafa et al. |
| 2004/0092313 A1 | 5/2004 | Saito et al. |
| 2004/0224772 A1 | 11/2004 | Canessa et al. |
| 2005/0026695 A1* | 2/2005 | Tsuchiyama et al. ........... 463/42 |
| 2006/0121990 A1 | 6/2006 | O'Kelley, II et al. |
| 2006/0122716 A1 | 6/2006 | Bortnik et al. |
| 2007/0156267 A1* | 7/2007 | Nozaki ............................ 700/91 |
| 2007/0191102 A1* | 8/2007 | Coliz et al. ...................... 463/42 |
| 2008/0108406 A1 | 5/2008 | Oberberger |
| 2008/0108425 A1 | 5/2008 | Oberberger |
| 2013/0165238 A1* | 6/2013 | Jerez .............................. 463/42 |
| 2013/0288788 A1* | 10/2013 | Lim et al. ....................... 463/31 |

FOREIGN PATENT DOCUMENTS

| | | |
|---|---|---|
| JP | 2001/079272 | 3/2001 |
| JP | 2004/041719 | 2/2004 |
| JP | 2004/097610 | 4/2004 |
| JP | 2004/329914 | 11/2004 |

(Continued)

OTHER PUBLICATIONS

Japanese Patent Application No. 2013-035157: Decision to Grant a Patent dated Nov. 18, 2013, 4 pages.

(Continued)

*Primary Examiner* — Lawrence Galka
(74) *Attorney, Agent, or Firm* — Baker & Hostetler LLP

(57) ABSTRACT

A game server includes an operation data receiving section that receives, from a terminal whereto a plurality of games is provided via a communication network, operation data for operating a virtual user created in a virtual space, an overall ranking creating section that creates an overall ranking based on ranking-per-game information related to the plurality of games stored in a storing section, an item extracting section that extracts a virtual item stored in a storing section and usable in a specific game, based on information on the overall ranking upon reception of predetermined operation data from the terminal, and an item setting section that sets an extracted virtual item as a virtual item possessed by the virtual user.

8 Claims, 19 Drawing Sheets

(56) References Cited

FOREIGN PATENT DOCUMENTS

| JP | 2006/158955 | 6/2006 |
| JP | 2006/158956 | 6/2006 |
| JP | 2008/119469 | 5/2008 |
| JP | 2012/024248 | 2/2012 |

OTHER PUBLICATIONS

Japanese Patent Application No. 2013-035157: Office Action dated Aug. 12, 2013, 3 pages.

* cited by examiner

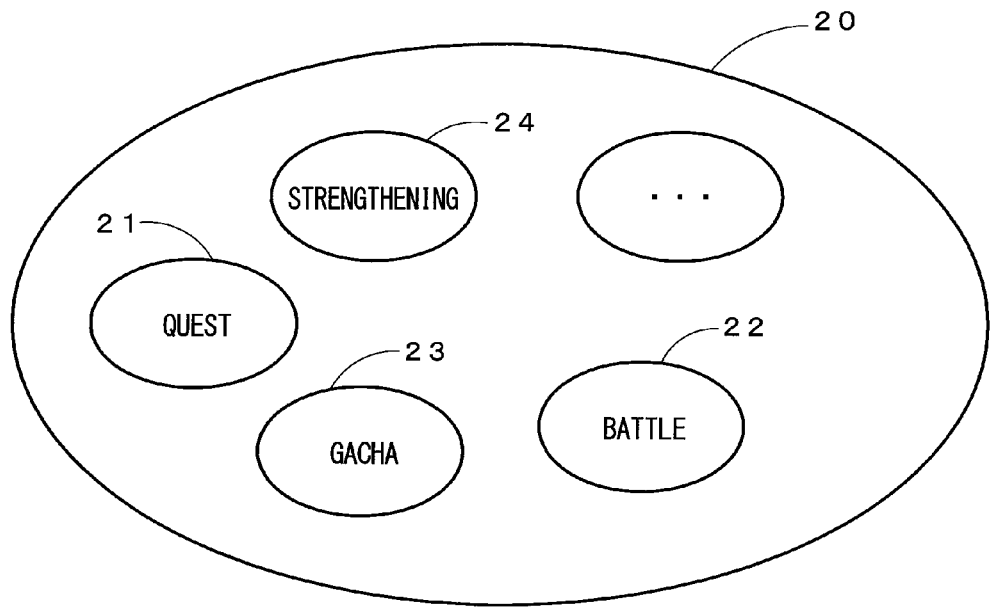
F I G. 2
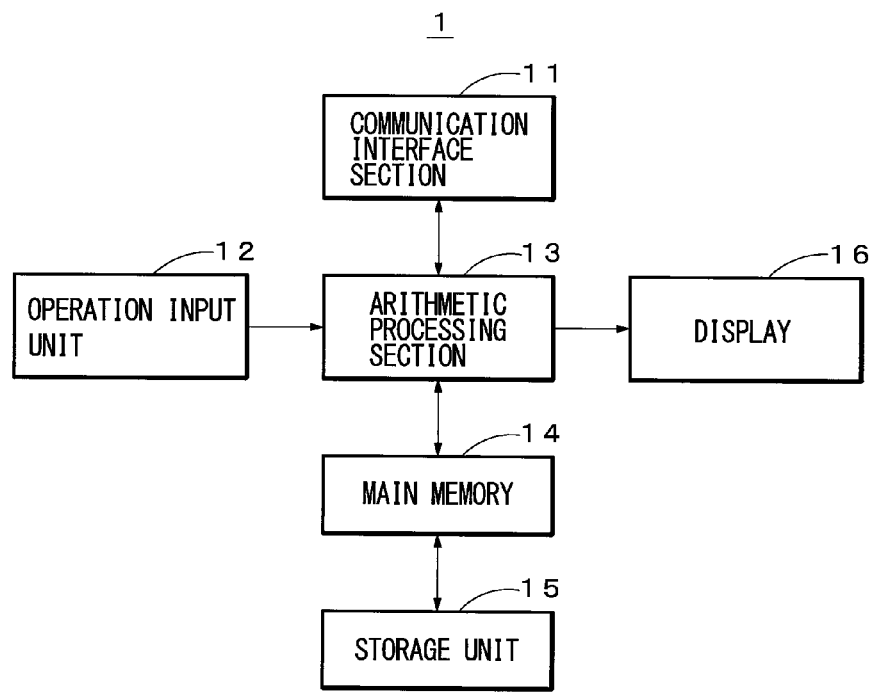
F I G. 3

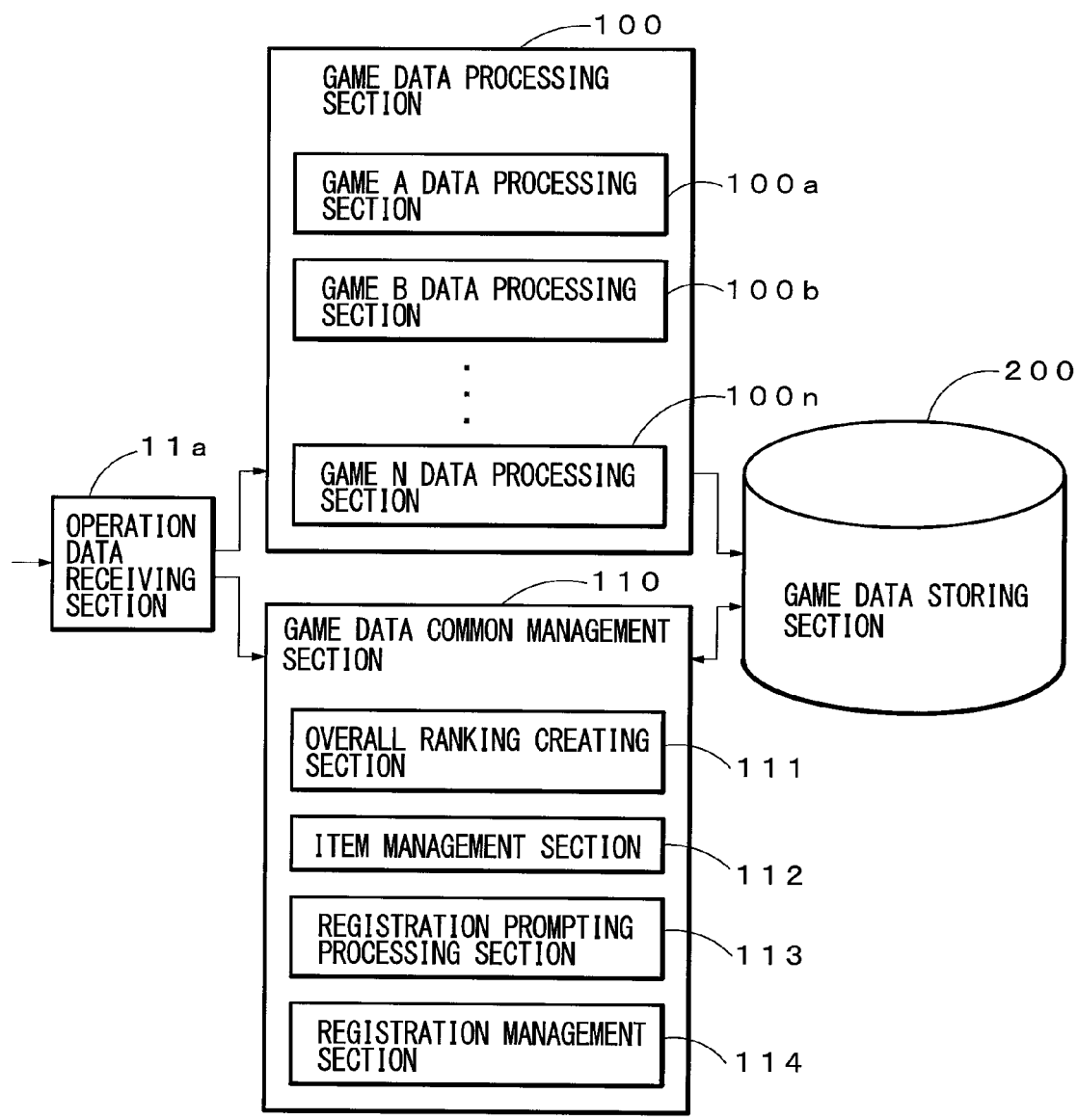
F I G. 4

| USER ID | GAME | ITEM ID | NUMBER OF UNITS |
|---|---|---|---|
| 30001 | A | 10001 | 2 |
|  |  | 10002 | 15 |
|  |  | 10003 | 3 |
|  |  | 10004 | 1 |
|  |  | ... | ... |
|  | B | ... | ... |
| 30002 | ... | ... | ... |

| ITEM ID | USE OF ITEM | FUNCTION OF ITEM | GAME IMAGE | ITEM IMAGE |
|---|---|---|---|---|
| 10001 | FOR QUEST | POINT RECOVERY RATE 100% | ... | ... |
| 10002 | FOR QUEST | POINT RECOVERY RATE 15% | ... | ... |
| 10003 | FOR BATTLE | POINT RECOVERY RATE 100% | ... | ... |
| 10004 | FOR BATTLE | POINT RECOVERY RATE 15% | ... | ... |
| 10005 | FOR GACHA | HIGH OCCURRENCE RATIO (SR CARD) | ... | ... |
| 10006 | FOR GACHA | HIGH OCCURRENCE RATIO (R CARD) | ... | ... |
| 10007 | FOR GACHA | HIGH OCCURRENCE RATIO (N CARD) | ... | ... |
| 10008 | FOR STRENGTHENING | STRENGTHENING RATIO (HIGH) | ... | ... |
| 10009 | FOR STRENGTHENING | STRENGTHENING RATIO (MODERATELY HIGH) | ... | ... |
| 10010 | FOR STRENGTHENING | STRENGTHENING RATIO (LOW) | ... | ... |
| ... | ... | ... | ... | ... |

F I G. 7

| RANKING RELATED TO GAME A | | |
|---|---|---|
| RANK | USER ID | SCORE |
| 1ST | ID30001 | 33000 |
| 2ND | ID30023 | 32000 |
| 3RD | ID30057 | 21000 |
| ... | ... | ... |
| ⋮ | ⋮ | ⋮ |
| 6329TH | ID30097 | 100 |

212A

F I G. 8 A

| RANKING RELATED TO GAME B | | |
|---|---|---|
| RANK | USER ID | SCORE |
| 1ST | ID30005 | 5200 |
| 2ND | ID30008 | 4900 |
| 3RD | ID30001 | 4800 |
| ... | ... | ... |
| ⋮ | ⋮ | ⋮ |
| 28333TH | ID30117 | 10 |

212B

F I G. 8 B

| USER ID | GAME | | 4/1 | ... | 6/1 | ... | 9/1 | 9/2 | 9/3 | 9/4 | 9/5 | 9/6 | 9/7 |
|---|---|---|---|---|---|---|---|---|---|---|---|---|---|
| 30001 | A | RELATIVE NUMBER OF OPERATIONS | 40 | ... | ... | ... | 120 | 110 | — | 90 | 105 | 78 | 43 |
| | | RELATIVE LEVEL VALUE | 10 | ... | ... | ... | 5 | 8 | 13 | 14 | 12 | 10 | 8 |
| | B | RELATIVE NUMBER OF OPERATIONS | — | ... | 51 | ... | 103 | 100 | — | — | — | 98 | 65 |
| | | RELATIVE LEVEL VALUE | — | ... | 23 | ... | 20 | 17 | 17 | 18 | 15 | 15 | 16 |
| | ⋮ | ⋮ | ⋮ | ⋮ | ⋮ | ⋮ | ⋮ | ⋮ | ⋮ | ⋮ | ⋮ | ⋮ | ⋮ |
| | ... | ... | ... | ... | ... | ... | ... | ... | ... | ... | ... | ... | ... |
| | ⋮ | ⋮ | ⋮ | ⋮ | ⋮ | ⋮ | ⋮ | ⋮ | ⋮ | ⋮ | ⋮ | ⋮ | ⋮ |
| 30002 | ... | | | | | | | | | | | | |

222

F I G. 1 0

| USER ID | GAME | ... | 9/1 | 9/2 | 9/3 | 9/4 | 9/5 | 9/6 | 9/7 |
|---|---|---|---|---|---|---|---|---|---|
| 30001 | A | ... | 3 | 5 | 8 | 4 | 2 | 1 | 1 |
|  | B | ... | 788 | 802 | 811 | 989 | 972 | 987 | 911 |
|  | ... | ... | ... | ... | ... | ... | ... | ... | ... |
| 30002 | A | ... | ... | ... | ... | ... | ... | ... | ... |
|  | C | ... | ... | ... | ... | ... | ... | ... | ... |
223
F I G. 1 1
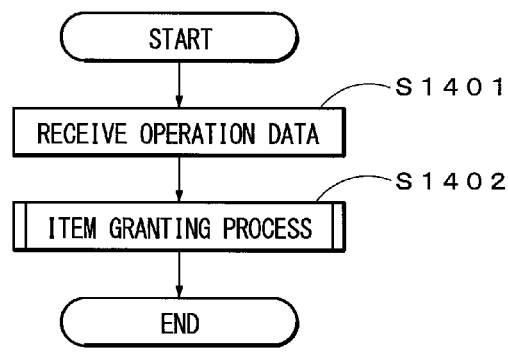
F I G. 1 4

| YEAR 2011 AB OVERALL RANKING ||
|---|---|
| RANK | USER ID |
| 1ST | ID30001 |
| 2ND | ID30005 |
| 3RD | ID30008 |
| ⋮ | ⋮ |
| 20TH | ... |

231A

F I G. 1 2 A

| YEAR 2011 CFG OVERALL RANKING ||
|---|---|
| RANK | USER ID |
| 1ST | ID30112 |
| 2ND | ID30001 |
| 3RD | ID30003 |
| ... | ... |
| ⋮ | ⋮ |

231B

F I G. 1 2 B

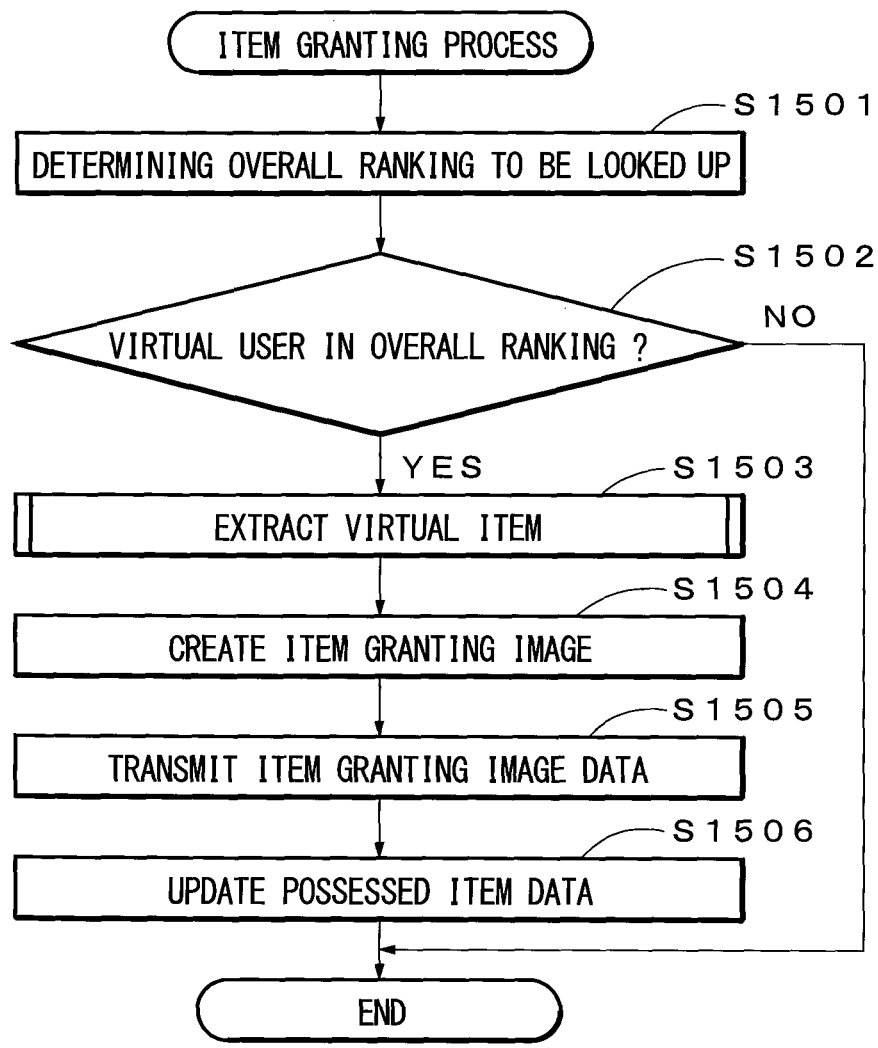
F I G. 1 5

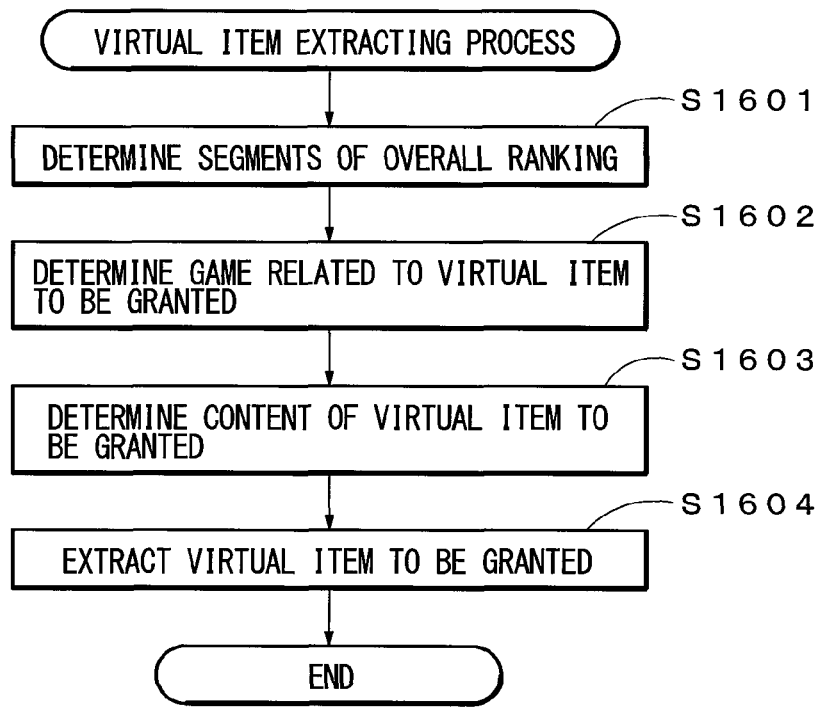
F I G. 16
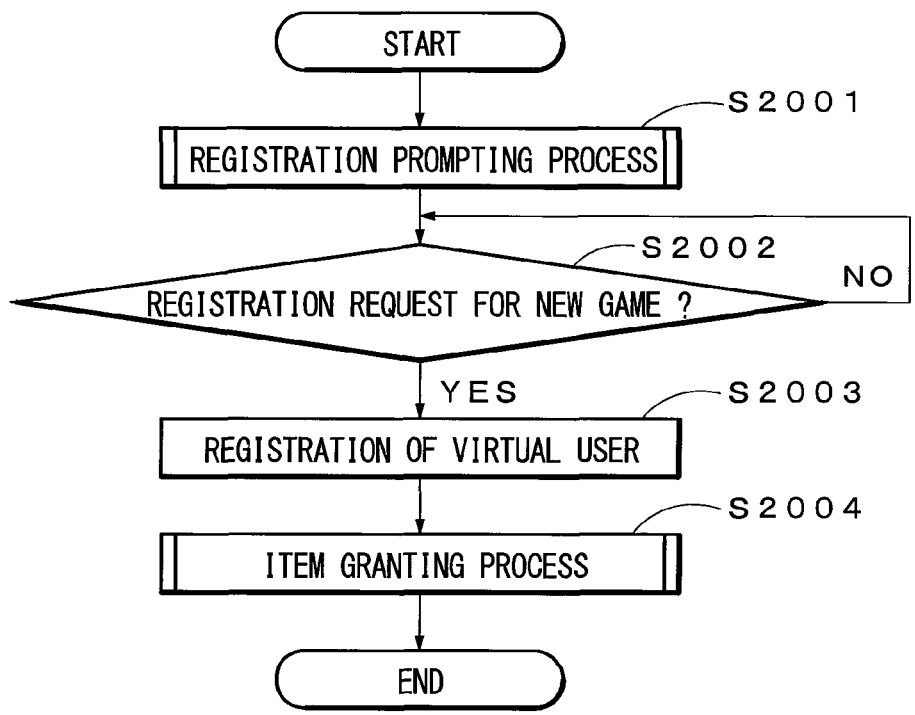
F I G. 20

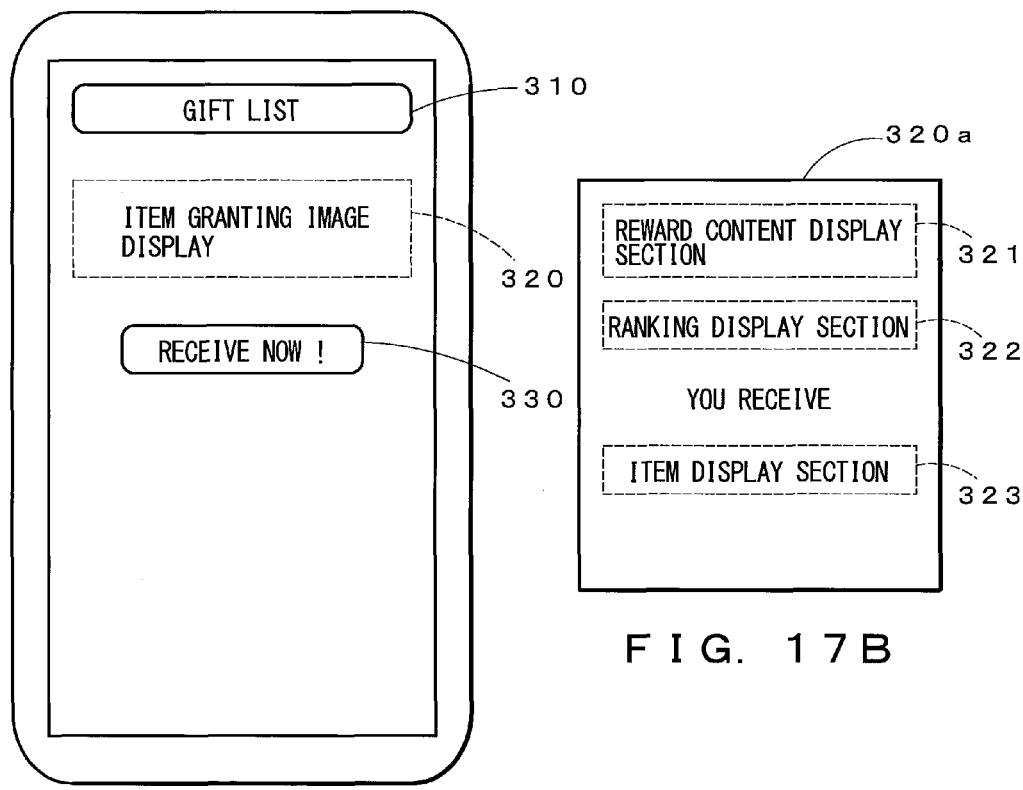
F I G. 17A
F I G. 17B

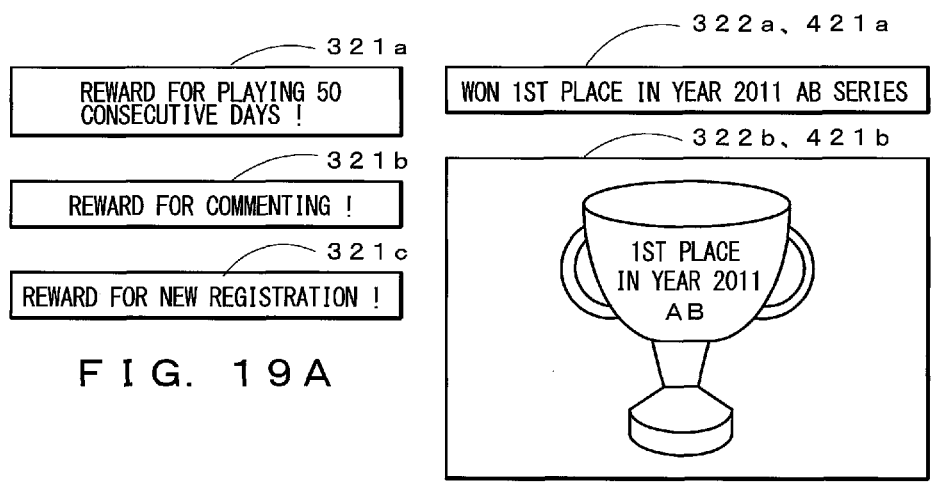
F I G. 19A
F I G. 19B
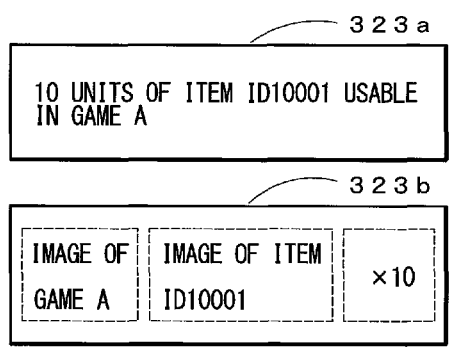
F I G. 19C

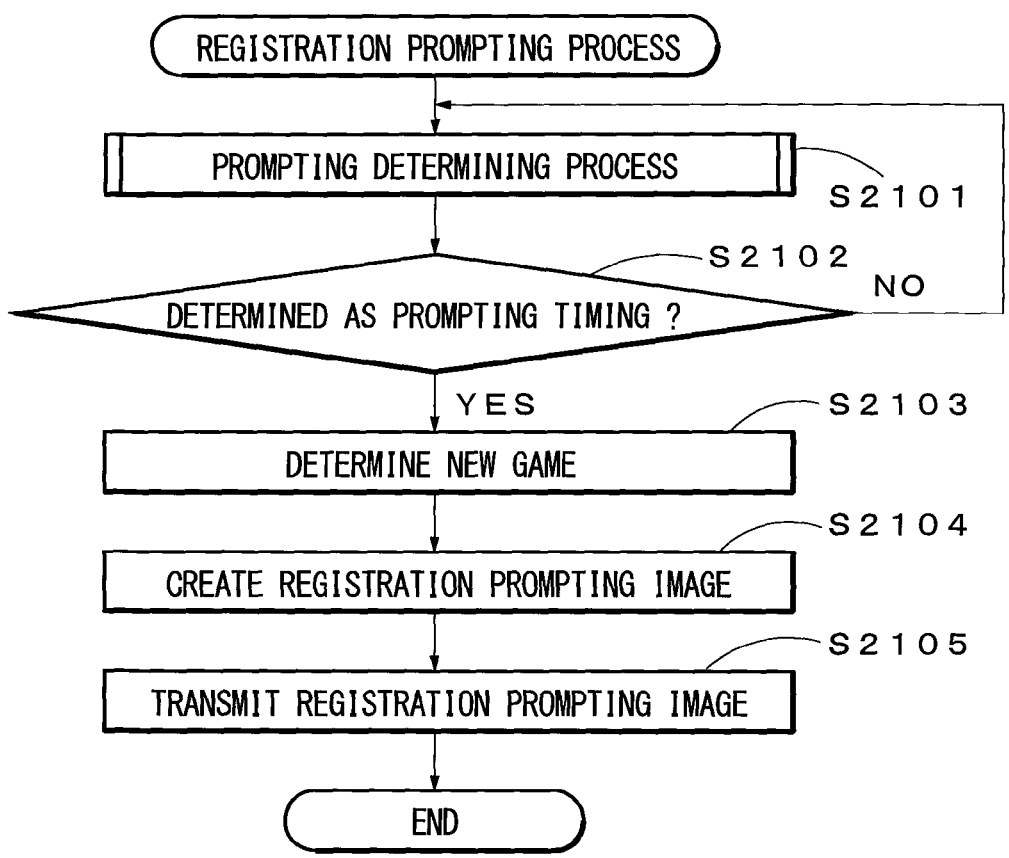
F I G. 21

MULTIGAME RANKING WITH VIRTUAL ITEM REWARDS

CROSS REFERENCE TO RELATED APPLICATIONS

This application claims the benefit of Japanese Patent Application No. 2013-035157 filed Feb. 25, 2013, which is hereby incorporated by reference in its entirety.

TECHNICAL FIELD

The present disclosure relates to a game server that manages a behavior of a virtual user existing in a virtual space using operation data from each terminal connected via a communication network, a method of controlling progression of a game provided by the game server, a non-transitory computer-readable medium storing a game program and a game system.

BACKGROUND ART

Recently, social network games (hereinafter referred to as social games), which are games provided using a Social Networking Service (SNS), are becoming more common with the spread of high-end portable terminals such as smartphones. A social game is a game in which a physical user operating a terminal controls, via a communication network, a virtual user that exists in a virtual space established by a game server to play a game online while communicating with other virtual users existing in the same virtual space (e.g., see Japanese Laid-Open Patent Publication No. 2012-24248).

Among such social games, there are some social games that create a ranking based on points obtained by a virtual user in a game. There are various types of points that are used in creating a ranking. For example, in a game in which a battle is mainly performed, a ranking is created based on battle points. A battle point is obtained through a battle against other users or a battle against monsters appearing in a virtual space.

The created ranking is displayed on an operation screen of a user's terminal. Through the operation screen, a user can recognize his/her position in the ranking. The user at a high rank in the ranking can feel a sense of superiority. Also, through the operation screen, a user can know which user is ranked high in the ranking. The user at a high rank in the ranking can call attention to his/her strength so that the user's desire to show off his/her strength is satisfied. The ranking, in the aforementioned methods, leads to an increase in the user's willingness to compete and leads to an improvement in his/her motivation to play a game.

However, such a ranking result is usually created for each game and not associated with other games. Although there may be a user who is registered for a plurality of games, rating of the user throughout a plurality of games cannot be obtained. Further, a user can see his/her rank in a certain game only through an operation screen specific to the game. Therefore, even if the user is ranked high in a certain game, he/she cannot feel a sense of superiority which comes from the high rank in the certain game in other games. Also, the user cannot impress other users who play other games that he/she is ranked high in a certain game, and thus his/her desire to make a boast of his/her strength in one particular game cannot be satisfied in other games. For a user registered for a plurality of games, there is a need for a mechanism for increasing willingness to play each of the games.

The present disclosure has been contrived based on the aforementioned disadvantages and it is an object of the present disclosure to provide a game server that can increase user's willingness to play a plurality of games, a game controlling method that controls progression of the game provided by the game server, a non-transitory computer-readable medium storing a game program and a game system.

SUMMARY (1) The game server disclosed herein includes a game server including an operation data receiving section that receives, from a terminal whereto a plurality of games is provided via a communication network, operation data for operating a virtual user created in a virtual space, an overall ranking creating section that creates an overall ranking based on ranking-per-game information related to the plurality of games stored in a storing section, an item extracting section that extracts a virtual item stored in a storing section and usable in a specific game, based on information on the overall ranking upon reception of predetermined operation data from the terminal, and an item setting section that sets an extracted virtual item as a virtual item possessed by the virtual user.

In the above-mentioned aspect, the item extracting section extracts a virtual item based on the information on the overall ranking of the virtual user. The virtual user can obtain a more valuable virtual item as the rank in the overall ranking becomes higher. Therefore, regarding the physical user operating a virtual user, it is possible to increase willingness to aim for a higher rank in the overall ranking. The overall ranking is a ranking created based on ranking-per-game information related to a plurality of games. For example, in a case where the overall ranking is created by combining rankings related to games A, B and C, motivation to play each of the three games can be improved.

(2) The preferred aspect of the game server according to the present disclosure further includes a registration request accepting section that accepts a request for registering a virtual user for a new game based on the operation data, and a user registration section that registers the virtual user for the new game in response to the request. After the user registration section has registered the virtual user, the item extracting section extracts a virtual item usable in the new game based on the information on the overall ranking.

In the above aspect, when the physical user registers for a new game, the item extracting section extracts a virtual item based on the information on the overall ranking of the virtual user for at least one game for which the relevant physical user has already registered. Particularly, a virtual user who is at a high rank in the overall ranking can obtain a virtual item that is more valuable than those of other virtual users when a new game is registered. Accordingly, the physical user operating a virtual user who is at a high rank in the overall ranking can play predominantly from an initial phase. In the present aspect, if ranked high in the overall ranking, it is possible to make the physical user realize a benefit that the game can be played predominantly from an initial phase. Accordingly, it is possible to make the physical user recognize that, if the virtual user can be ranked high in the overall ranking by intensively playing a game which the physical user has newly started to play, he/she will have an advantage in the next new game. Thereby, it is possible to increase willingness to compete for being ranked high in the overall ranking and can increase willingness to play the game.

(3) The preferred aspect of the game server according to the present disclosure further includes a registration prompting display outputting section that displays, in a game for which the virtual user is registered, a prompt for registration for a new game, and a prompting determining section that determines whether or not to display the prompt based on operation history information of the terminal operating the virtual user. The prompting determining section determines to display the prompt in a case where, between a predetermined previous time point and a current time point, at least one of an experience value and a number of operations of the virtual user is decreasing with respect to an average experience value and an average number of operations in a game for which the virtual user is registered.

In the above aspect, the prompting determining section determines whether or not to transmit, to the terminal, registration prompting data for prompting registration for a new game. Specifically, the prompting determining section determines based on transition of an experience level and a number of operations of the virtual user between a predetermined previous time point and a current time point. An average experience value is an average value of the experience values of a plurality of virtual users registered with a certain game. Here, an experience value of the virtual user on the basis of an average experience value is a "relative experience value". The relative experience value is a value that indicates how high the experience value of the virtual user is when the average experience value was assumed to be 100. For example, it is assumed that an average experience value between a predetermined previous time point and a current time point is 80 and the experience value of a specific virtual user is 40. Also, assuming that the current average experience value is 100 and the experience value of a specific virtual user is 45. Then, the former relative experience value becomes 50 and the latter relative experience value becomes 45. In this case, between a predetermined previous time point and a current time point, the relative experience value is decreasing. That is, the experience value of the virtual user on the basis of a mean experience value is decreasing. The average number of operations is an average value of a number of operations of a plurality of virtual users registered for a certain game. A number of operations of the virtual user with reference to an average number of operations is defined as a "relative number of operations". The determination of whether or not a relative number of operations decreases can be performed by a method similar to the determination of whether or not the relative experience value is decreasing.

In the present aspect, in at least one game for which a virtual user is registered, a case in which at least either the relative experience value or the relative number of operations is decreasing is regarded as a state where willingness to play of the physical user operating the virtual user is decreasing. In other words, the registration prompting data transmitter section transmits registration prompting data when willingness to play is decreasing in at least one game which the physical user has registered. Conversely, the registration prompting data transmitter section does not transmit registration prompting data when the physical user has high willingness to play in all the registered games. Registration of a new game can be prompted by suggesting registration of the new game to the physical user whose willingness to play the game is decreasing.

(4) The preferred aspect of the game server according to the present disclosure further includes a registration prompting display outputting section that displays, in a game for which the virtual user is registered, a prompt for registration for a new game, and a prompting determining section that determines whether or not to display the prompt based on operation history information of the terminal operating the virtual user and ranking-per-game history information of the virtual user. The prompting determining section determines to display the prompt in a case where, between a predetermined previous time point and a current time point, a number of operations from the terminal operating the virtual user is greater than an average number of operations in the game for which the virtual user is registered and a value of variation in the ranking-per-game of the virtual user is less than or equal to a predetermined threshold.

In the above aspect, the prompting determining section determines whether or not registration prompting data promoting registration of new game is to be transmitted to the terminal. Specifically, the prompting determining section determines by number of operations and transition of the rank of the virtual user between a predetermined previous time point and a current time point. In the present aspect, a case where a number of operations of the virtual user is greater than an average number of operations is regarded as a state where the physical user operating the virtual user is enthusiastic for the game. In other words, the registration prompting data transmitting section transmits registration prompting data when ranking-per-game has not changed so much despite the fact that the physical user is playing the game enthusiastically. When the ranking-per-game does not change much, the physical user operating the virtual user may lose motivation to raise the rank. Although the physical user is currently enthusiastic in the game, it is assumed that his willingness to play the game will soon decrease. By suggesting registration of a new game to the physical user whose willingness to play the game may soon decrease, it is possible to prompt to a new game while maintaining motivation to play the game.

(5) According to the preferred aspect of the game server according to the present disclosure, the plurality of games is one of a plurality of games provided by a single game provider, a plurality of games of a single genre, and a plurality of games among which a minimum charging amount required for purchasing a virtual item is the same.

In the above aspects, the plurality of games is a plurality of games provided by the same game provider. For example, when a certain game provider is providing games A, B and C, the overall ranking is created by combining games A to C. It is a good deal for the physical user playing game A to also play games B and C, since he/she can obtain a virtual item usable in particular game. The physical user can be prompted to play in a plurality of games provided by a single game provider. A plurality of games provided by the same game provider often resembles each other in terms of their specifications. The physical user playing such a plurality of games can be made to get used to the game and make him attached to the game. Thereby, the game provided by a particular game provider can be made to be played continuously.

Also, in the above aspect, the plurality of game is a plurality of games of a single genre. For example, the physical user who prefers battle games often registers for a plurality of battle games. By gathering rankings related to the games of a single genre, it is possible to increase the motivation of the physical user who prefers such a genre.

Also, in the above aspect, the plurality of games is a plurality of games among which a minimum charging amount required for purchasing a virtual item is the same. If the minimum charging amount is the same, the physical user can be charged to a plurality of games in the same sense. It is possible to charge smoothly to the physical user aiming for a higher rank in the overall ranking.

In any of the aspects, the game server of the present disclosure can be regarded as a game control method controlling progression of a game provided by the game server, non-transitory computer-readable medium, and a game system.

According to an aspect of the present disclosure, willingness to play in a plurality of games can be increased by extracting a virtual item usable in a particular game based on the information on the overall ranking created by combing ranking information of a plurality of games.

BRIEF DESCRIPTION OF DRAWINGS

FIG. 2 is a diagram for explaining a configuration of a social game provided by a game server of the present disclosure.

FIG. 3 is a diagram showing a hardware configuration of the game server of the present disclosure.

FIG. 4 is a diagram showing a configuration of each processing section executed by the game server of the present disclosure.

FIG. 7 is a diagram for explaining a specific example of an item data table.

FIGS. 8A and 8B are diagrams for explaining a specific example of a ranking-per-game data table.

FIG. 10 is a diagram for explaining a specific example of an operation history data table.

FIG. 11 is a diagram for explaining a specific example of a ranking history data table.

FIGS. 12A and 12B are diagrams for explaining a specific example of an overall ranking data table.

FIG. 14 is a diagram for explaining an overall flow carried out in an item managing section.

FIG. 15 is a diagram showing a specific procedure of a process carried out in an item managing section.

FIG. 16 is a diagram showing a specific procedure of a process carried out in an item extracting section.

FIGS. 17A and 17B are diagrams for explaining a display example of an item granting image.

FIGS. 19A, 19B and 19C are diagrams for explaining specific display examples of the item granting image and the registration prompting image.

FIG. 20 is a diagram for explaining an overall flow of a process carried out in the registration prompting processing section and the item managing section.

FIG. 21 is a diagram showing a specific procedure of a process carried out in the registration prompting processing section.

DETAILED DESCRIPTION OF EMBODIMENTS

Figure 1:
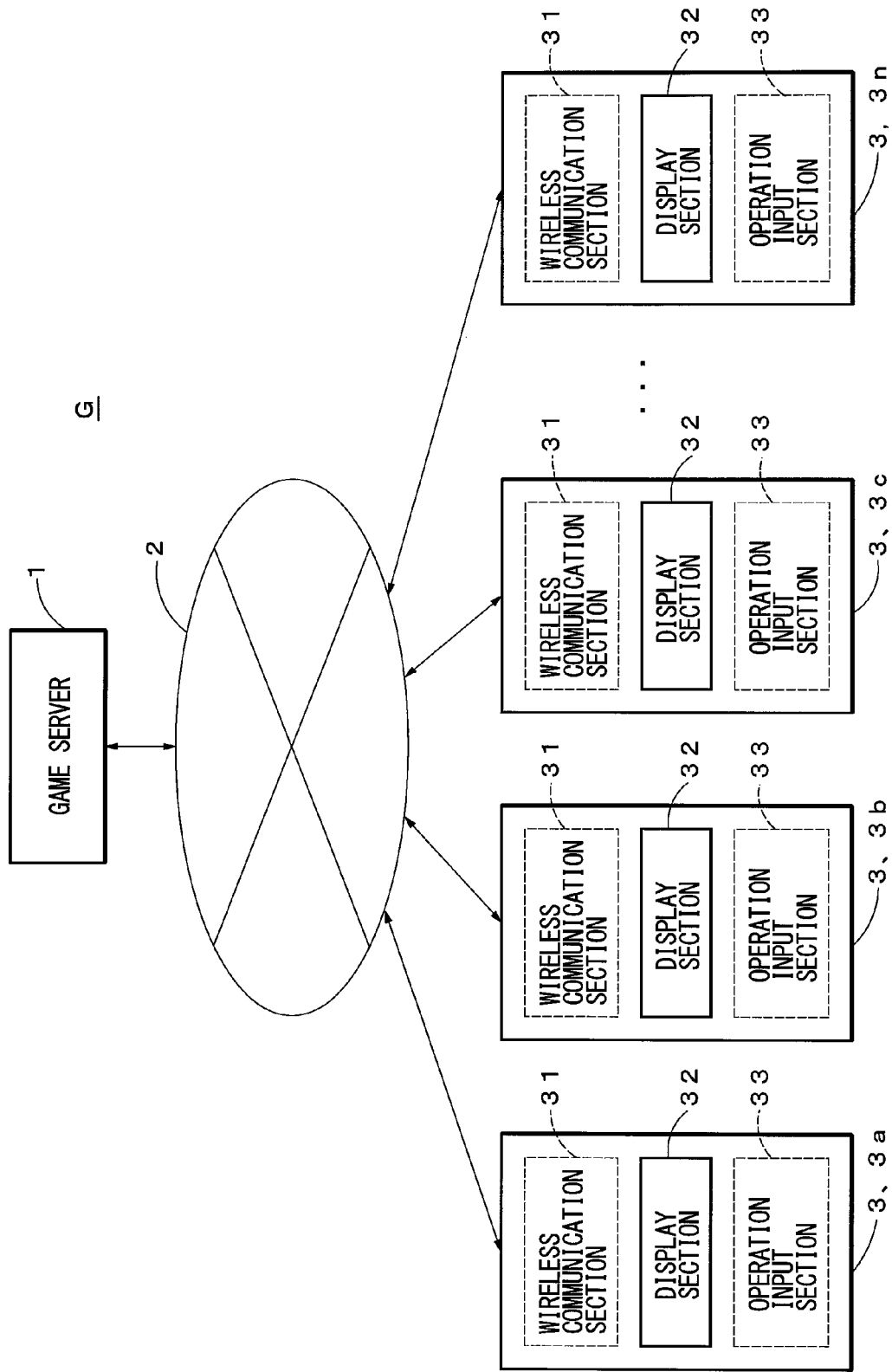
FIG. 1 is a diagram showing a system configuration of a game system of the present disclosure.

Further features of the disclosure will become apparent from the following detailed description of exemplary embodiments with reference to the attached drawings. The present embodiment relates to a game system that provides a game to a terminal connected to a game server via a communication network. Specifically, as shown in FIG. 1, a game system G of the present embodiment includes a game server 1 that provides a game to a user, and terminals 3a, 3b, 3c, ..., 3n (hereinafter, also collectively referred to as a terminal 3) connected to the game server 1 via a communication network such as the Internet 2.

In the following description, prior to describing the embodiment, the definitions of terms used in the present embodiment will be clarified. Further, a general outline of a social game concerning the present embodiment will be described. Thereafter, a configuration of the game system G and a process performed by the game system G will be described in detail.

(1) DEFINITIONS OF TERMS

The definitions of terms used in the present embodiment are as follows.

"Virtual space" means a virtual world that is created during a game based on content of the game and refers to a space different from a physical space. The "virtual space" shown on a display (a display section) of the terminal 3 is two-dimensional. However, a conceptual space created by executing a program in the server 1 via a communication network with connections to another terminal 3 is not limited to a two-dimensional space.

"Physical user" means an entity operating a terminal, i.e., a person. "Virtual user" means a virtual entity representing the user in the virtual space in accordance with a button operation or a touch operation on the terminal of the physical user, or a virtual entity which is created based on a taste or preference of the user. The "virtual user" includes, for example, pieces or tiles operated in the virtual space as an existence representing the "physical user" such as a player in conventional shogi games or mahjong games that is not visible in the game. The "virtual user" also includes a particular visible character that is displayed in the game such as a role playing game or a player-versus-opponent game and that moves or performs an action. Further, the "virtual user" includes a virtual entity displayed as an avatar in a SNS. Accordingly, the "virtual user" in the present embodiment is used as a term that broadly represents the virtual entity in the virtual space, regardless of whether it is a virtual entity which is embodied in a game or a virtual entity which is not embodied.

"Point" means a point granted to the virtual user in the virtual space and allows a target game part to progress when the virtual user consumes the point in the virtual space.

"Registration" is a procedure that a physical user carries out when newly starting a game. When the "registration" for a game by the physical user is completed, a virtual user is registered for the game. When the virtual user is registered, the physical user is allowed to play the relevant game.

"New game" means a game for which a physical user has not yet completed the registration, i.e., a game for which a virtual user is not yet registered. It is not limited to a meaning that the game itself is new or not much time has elapsed after the game has been released into the market.

"Experience value" is a parameter that increases when the virtual user achieves a mission given in the game. When an experience value reaches a particular value, a "level" of the virtual user increases. The experience value necessary to increase one level may be the same between levels or may be different between levels. Usually, as the level increases, an experience value necessary for increasing one level increases. More simply, comparison of the experience values may be carried out by comparing the levels. Note that, the level is provided such that a single level is given for an entirety of a single game rather than giving a level unique to a quest part constituting one of the parts in a game.

(2) GENERAL OUTLINE OF SOCIAL GAME

Next, a general outline of a social game provided from the game server 1 to the terminal 3 connected via the Internet 2 will be described with reference to FIG. 2.

Generally, a social game is a game in which, in a virtual space, a virtual user performs an action in response to an operation of the terminal 3 by the physical user. For example, it is a game in which an item list of a predetermined number of cards (hereinafter, referred to as a deck) is created from among various kinds of virtual cards (hereinafter, simply referred to as cards) each having a character displayed thereon.

This type of social game is established as a single game and as a whole with a plurality of parts being combined organically to complete a single story or a character. For example, as shown in FIG. 2, a social game 20 includes a quest part 21, a battle part 22, a gacha part 23 and a strengthening part 24.

The quest part 21 is a part in which the virtual user quests in a virtual space and obtains virtual items or the like. In the quest part 21, the virtual user is given a predetermined number of quest points. Actions such as a movement of the virtual user, an obtainment of a virtual item, and so on, are accomplished by consuming the quest point.

The battle part 22 is a part in which the virtual user battles against another virtual user or a game character as an enemy. In the battle part 22, a win or a loss is determined based on the offensive power and the defensive power of the virtual user.

The gacha part 23 is a part in which a virtual item can be obtained randomly. A virtual item can be obtained by consuming a gacha point.

The strengthening part 24 is a part in which an offensive power for attacking an enemy and/or a defensive power for defending from a user is strengthened by strengthening a virtual item possessed by the virtual user and increasing a level representing a strength which is displayed on a virtual item.

The social game 20 constituted by the plurality of parts described above is meaningful as an entire game because none of the game parts is independent from the other, in other words, each of the game parts is related and combined with the other. Therefore, with the social game 20, an entire game can be progressed by the virtual user making progress in each of the game parts.

(3) BASIC HARDWARE CONFIGURATION

(3-1) Configuration of Terminal

Hereinafter, a hardware configuration for obtaining a game system G of the present embodiment will be described based on the definition of the social game 20 described above.

As shown in FIG. 1, the terminal 3 may be a portable wireless communication terminal that may include, for example, a wireless communication section 31, a display section 32 and an operation input section 33. The wireless communication section 31 is connected to the Internet 2 by a mobile telephone line or a wireless LAN circuit and performs data communication with the game server 1 by using a web browser. The display section 32 displays a screen of a web browser received from the game server 1. The operation input section 33 is, for example, composed of a touch panel that receives operation input from a physical user in accordance with display on a screen of the display section 32. The operation input thus received from the physical user is transmitted to the game server 1 by the wireless communication section 31.

With the terminal 3 having such a hardware configuration, for example, an individual authentication process of the terminal is performed using a combination of a pre-registered user ID and a predetermined password. When the authentication between the terminal 3 and the game server 1 is completed, the terminal 3 receives data necessary for progression of a game from the game server 1 and transmits operation data inputted though the operation input section 33 to the game server 1.

The terminal 3 can be a mobile telephone, a PDA or a personal computer as long as it is a communication device capable of communicating with the game server 1 via a communication network such as the Internet 2. The operation input section 33 has been described using a touch panel as an example, but may be of a configuration in which information is inputted through performing a selection operation by moving a cursor with a physical key operation.

(3-2) Schematic Configuration of Game Server

The game server 1 to be connected to the terminal 3 is embodied as a computer having a general-purpose hardware configuration as shown in FIG. 3, for example. That is to say, as shown in FIG. 3, the game server 1 includes a communication interface section 11 that establishes communications with the terminal 3 via the Internet 2, and an operation input unit 12 such as a keyboard or a mouse that allows an operation input from a physical user. Further, the game server 1 is provided with an arithmetic processing section 13 such as a CPU that executes various arithmetic processing, a main memory 14 such as an SRAM or a DRAM that temporarily stores arithmetic processing data, a storage unit 15 such as a hard disk in which application programs and various data are stored, and a display 16 that displays an outcome of the arithmetic process.

The game server 1 has function blocks as shown in FIG. 4 obtained by storing, in the storage unit 15, a program for offering such social game 20 to a physical user.

That is to say, the game server 1 realizes functions implemented by, for example, an operation data receiving section 11a, a game data processing section 100, a game data common management section 110, and a game data storing section 200 that manages game data, shown in FIG. 4. Data concerning a process carried out in the game data processing section 100 is stored in the game data storing section 200. The game data common management section 110 performs each process based on the data stored in the game data storage section 200. Data concerning a process carried out in the game data common management section 110 can be stored in the game data storing section 200.

The operation data receiving section 11a is a section that receives operation data sent from the terminal 3 through the communication network 2.

Figures 5, 9:
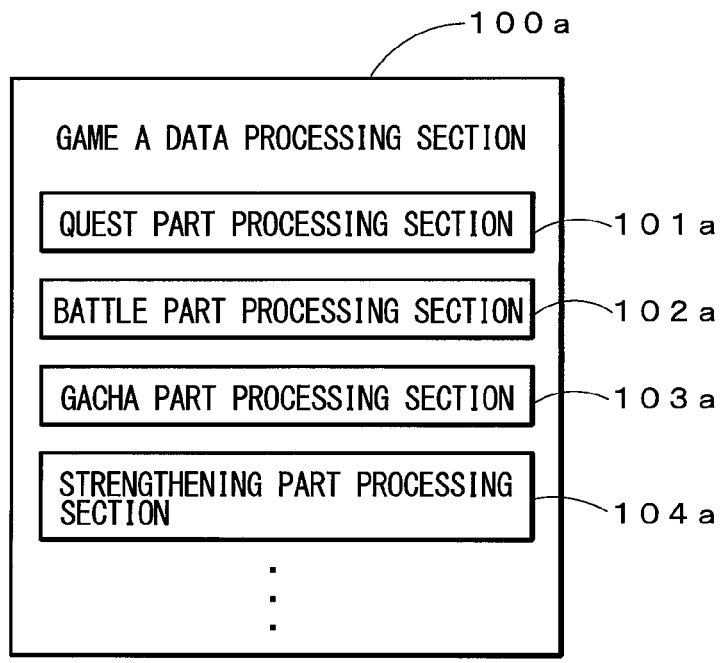
FIG. 5 is a diagram showing a specific configuration of a game data processing section.
FIG. 9 is a diagram for explaining a specific example of a possessed item data table.

The game data processing section 100 has game data processing sections 100a to 100n for games A to N, respectively. As illustrated in FIG. 5, the game data processing section 100a has a quest part processing section 101a, a battle part processing section 102a, a gacha part processing section 103a and a strengthening part processing section 104a. Referring to FIG. 4, the game data common management section 110 has an overall ranking creating section 111, an item managing section 112, a registration prompting processing section 113 and a registration management section 114.

Here, the quest part processing sections 101a to 101n execute data processing for the quest part 21. The battle part processing sections 102a to 102n execute data processing for the battle part 22. The gacha part processing sections 103a to 103n execute data processing for the gacha part 23. The strengthening part processing sections 104a to 104n execute data processing for the strengthening part 24.

(3-3) Specific Configuration of Game Server

Now, a specific configuration of the game data storing section 200, the overall ranking creating section 111, the item managing section 112, the registration prompting processing section 113 and the registration management section 114 will be described with reference to FIG. 6.

(3-3-1) Configuration of Game Data Storing Section

Figure 6:
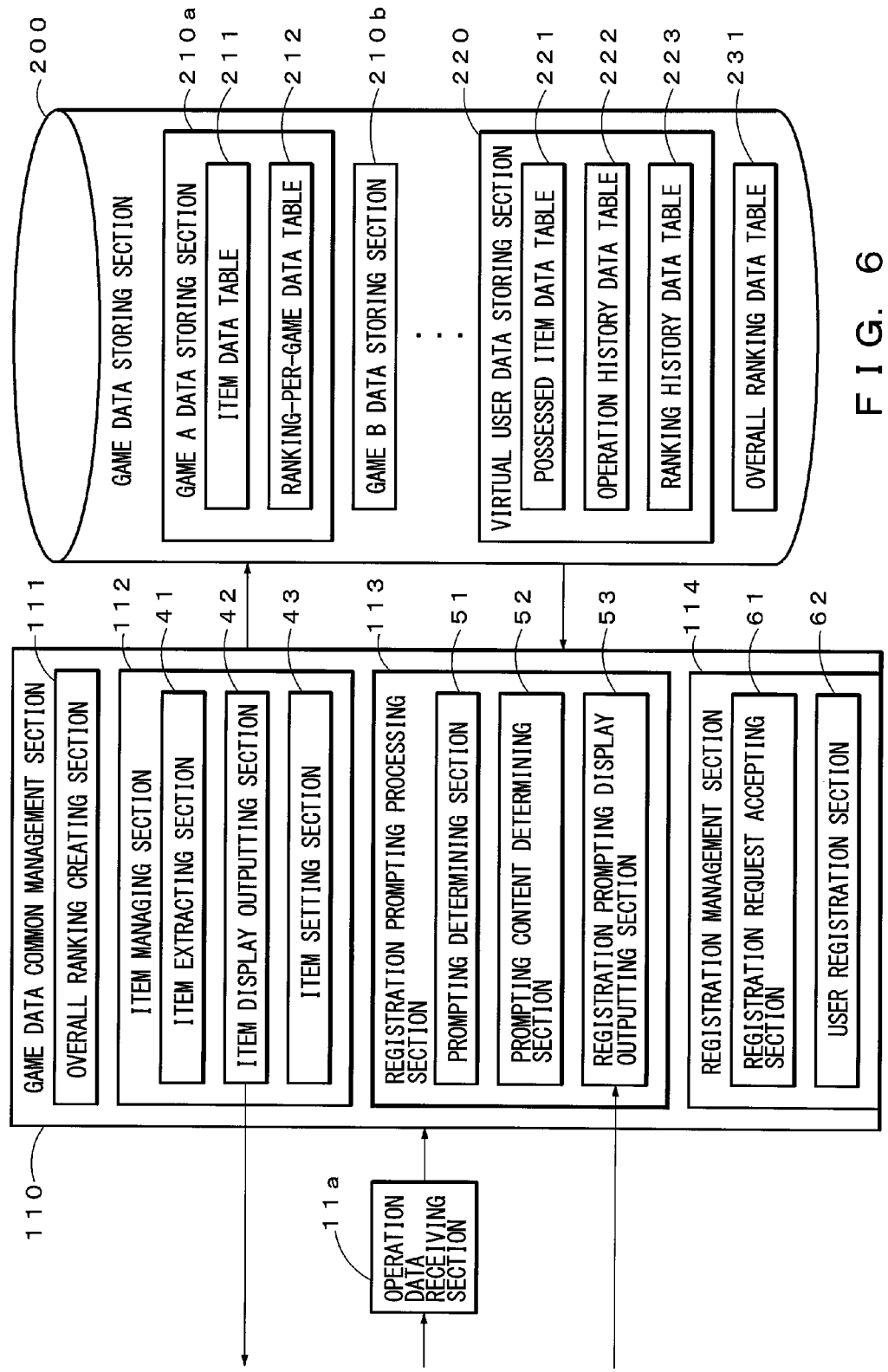
FIG. 6 is a diagram for explaining a specific process of a game common management section.

As shown in FIG. 6, the game data storing section 200 has game data storing sections 210a to 210n for games A to N, respectively, a virtual user data storing section 220 and an overall ranking data table 231 that store data used in the overall ranking creating section 111, the item managing section 112 and the registration prompting processing section 113. The Game A data storing section 210a has an item data table 211 and a ranking-per-game data table 212. Each of the game data storing sections 210b to 210n has a configuration similar to that of the game A data storing section 210a.

The item data table 211 manages, for each game, virtual items usable in a game as a list. FIG. 7 shows an example of a list of virtual items that is usable in game A.

As illustrated in FIG. 7, each virtual item is given an "item ID", which is a number unique to each item.

"Use of item" represents a game part in which each virtual item is usable. For example, as shown in FIG. 7, there are virtual items for quest, for battle, for gacha, and for strengthening, and they are usable in the quest part 21, the battle part 22, the gacha part 23, and the strengthening part 24, respectively.

"Function of item" represents a function possessed by each virtual item. Virtual items usable in a single game part may be of one kind or may be of many kinds. Hereinafter, a case in which many kinds of virtual items usable in one game exist will be described with reference to FIG. 7.

As illustrated in FIG. 7, items having item IDs 10001 and 10002 are items for quest that are usable in the quest part 21. Items having item IDs 10003 and 10004 are items for battle that are usable in the battle part 22. These items for quest have functions of recovering quest points consumed in the quest part 21 by the virtual user, and these items for battle perform the function of recovering battle points consumed in the battle part 22 by the virtual user. The item for quest and the item for battle may be of a plurality of types with different recovery rates for each of the points. For example, there may be a type that has a function of recovering all points, such as items having item IDs 10001 and 10003, and there may be a type that has a function of recovering a part of the points, such as items having item IDs 10002 and 10004. In this manner, different recovery rates may be set for virtual items having the point recovery function. Accordingly, when a virtual item having a high recovery rate is granted to a virtual user, a sense of accomplishment and a feeling of satisfaction can be given to the physical user operating the virtual user.

As illustrated in FIG. 7, items having item IDs 10005 to 10007 are items for gacha which is usable in the gacha part 23. These items for gacha have a function of granting, to a virtual user, a virtual card usable in the game. The virtual card has a "rarity value" which is an index indicating the rarity. The rarity may be ranked, for example, as "S rare (SR)", "rare (R)" and "normal (N)" in a descending order. Depending on a content of the game, in order to emphasize the rarity of the card, a card having a higher rank may have a higher battle ability value that would be exerted in a battle against an enemy, as compared to a card having a lower rank. The item for gacha may be of a plurality of types with different occurrence ratio of a virtual card having a rarity value. For example, there may be a type that has a high occurrence ratio of an SR card, such as an item having an item ID10005, a type that has a high occurrence ratio of an R card, such as an item having an item ID10006, and a type that has a high occurrence ratio of an N card, such as an item having an item ID10007. In this manner, the virtual item having the function of granting a virtual card having a rarity value may be provided with an occurrence ratio of the virtual card having a rarity value. Accordingly, when a virtual item having a high possibility of obtaining a virtual card of a high rarity value is granted to a virtual user, a sense of accomplishment and a feeling of satisfaction can be given to the physical user operating the virtual user. Note that the "virtual card" which can be obtained by the virtual user using the item for gacha is not limited to cards, and may be any other type as long as it is usable within the game.

As illustrated in FIG. 7, items having item IDs 10008 to 10010 are items for strengthening that are usable in the strengthening part 24. The item for strengthening has a function of increasing an ability value such as an offensive power or a defensive power associated with the virtual card. The item for strengthening may be of a plurality of types with different strengthening ratio indicating a degree of increasing the ability value associated with the virtual card. For example, there may be a type that has a high strengthening ratio, such as an item having an item ID10008, a type that has a moderately high strengthening ratio, such as an item having an item ID10009, and a type that has a low strengthening ratio, such as an item having an item ID10010. In this manner, the virtual item having the function of increasing an ability ratio of a virtual card may be provided with a strengthening ratio. Accordingly, when a virtual item having a high a strengthening ratio is granted to a virtual user, a sense of accomplishment and a feeling of satisfaction can be given to the physical user operating the virtual user.

"Item image" and "game image" are image data that represent a virtual item or a game, respectively, and display processing data in which such image data is incorporated is transmitted from the game server 1 to the terminal 3. Note that since FIG. 7 shows an example of a table of virtual items usable in game A, a game image stored in the item data table 211 of FIG. 7 is an image related to game A and is common between the virtual items throughout the table.

The ranking-per-game data table 212 manages a ranking created for each game as a list. FIG. 8A shows an example of a ranking for game A, and FIG. 8B shows an example of a ranking for game B. In the ranking-per-game data tables 212A and 212B, identification information of virtual users corresponding to the first place to the last place in the ranking and a score obtained by each virtual user are stored. For example, referring to the ranking-per-game data table 212A of FIG. 8A, it can be seen that the virtual user having a user ID30001 has obtained a score of 33000 in game A and is ranked at the first place in game A.

The virtual user data storing section 220 has a possessed item data table 221, an operation history data table 222 and a ranking history data table 223.

The possessed item data table 221 stores identification information of a virtual item obtained by each virtual user in a game. For example, referring to the possessed item data table 221 of FIG. 9, it can be seen that a virtual user having user ID 30001 possesses two virtual items having item ID 10001.

The operation history data table 222 stores, for each virtual user, operation history data of a terminal from which the virtual user is operated. As illustrated in FIG. 10, an operation history data table 222 stores a relative number of operations and a relative level value as operation history information.

The relative number of operation is a value that indicates a number of operations of a target virtual user with respect to an average number of operations of active users for each predetermined period of time. "Number of operations" means a number of times the physical user performs an operation input. "Active user" means a frequently operated virtual user among virtual users registered for each game. Specifically, the active user can be defined as a virtual user which is operated a predetermined number of times or more within a predetermined period of time in a particular game. For example, a virtual user for which at least one operation is performed in a day may be defined as an active user. The relative number of operations shown in FIG. 10 is a value calculated per day as: (number of operations of target virtual user)÷(average number of operations of active user)×100. That is, the day on which the relative number of operations is exceeding 100 indicates that the physical user is carrying out operations for the average number of times or more.

A relative level value is a value that indicates a level of the target virtual user with respect to an average level of virtual users registered for each game for each predetermined period. "Level" is a numeric value representing a degree of progression of the virtual user in the game. "Experience value" is a parameter that increases when a virtual user achieves a mission that is given in the game, and "level" of the virtual user increases when the "experience value" reaches a particular value. For example, when the experience value reaches 100, the level increases from 1 to 2, and when the experience value further increases by 150, the level increases from 2 to 3. Thus, it can be configured in such a manner that the experience value necessary to increase the level by one increases as the level becomes higher. The relative level value shown in FIG. 10 is a value calculated per day as: (level value of target virtual user)÷(average level value of all registered virtual users)×100.

The ranking history data table 223 stores ranking information of each of the virtual users in each game for each predetermined period. In the ranking history data table 223 of FIG. 11, ranking information of the virtual user is stored for each day. For example, by referring to the ranking history data table 223 of FIG. 11, it can be seen that the virtual user having user ID30001 was at a 3rd place in the ranking on September 1 (in FIG. 11, denoted as 9/1).

The overall ranking data table 231 manages an overall ranking as a list by combining the rankings-per-game of a plurality of games. FIG. 12A is an example of information on the overall ranking in which ranking information for games A and B are combined, and FIG. 12B is an example of the information on the overall ranking in which ranking information for games C, F and G are combined. In the overall ranking data table 231, identification information of virtual users corresponding to the first place to the last place of the ranking is stored. For example, by referring to the overall ranking data table 231A of FIG. 12A, it can be seen that the virtual user having user ID30001 is at the first place in the overall ranking in which rankings for games A and B are combined.

(3-3-2) Configuration of the Overall Ranking Creating Section

The overall ranking creating section 111 creates an overall ranking based on the ranking-per-game data tables 212A and 212B of FIGS. 8A and 8B. Data of the overall ranking is stored in the overall ranking data tables 231A and 231B of FIGS. 12A and 12B.

(3-3-3) Configuration of the Item Managing Section

A detailed configuration of an item managing section 112 will now be described. The item managing section 112 includes an item extracting section 41, an item display outputting section 42 and an item setting section 43 as shown in FIG. 6.

The item extracting section 41 is a section that extracts a virtual item based on the information on the overall ranking of the target virtual user by looking up the item data table 211 of FIG. 7 and the overall ranking data tables 231A and 231B of FIGS. 12A and 12B. Specifically, the item extracting section 41 divides the overall ranking from the first place to the last place into a plurality of segments. Then, for each segment, types and a number of virtual items are determined. Then, a corresponding virtual item is extracted depending on which segment the overall ranking of the target virtual user belongs to.

The item display outputting section 42 is a section that transmits, in order to display the virtual item extracted by the item extracting section 41, display processing data related to a content of the virtual item to the terminal 3 connected via the Internet 2. The content of the virtual item that the item extracting section 41 has extracted is displayed in a game in which the relevant virtual item is usable.

Note that the display process data transmitted by the item display outputting section 42 is not limited to a case where image data is transmitted to the terminal 3, but may be display control data for controlling the displaying of image data stored on the terminal 3 side.

The item setting section 43 is a section that updates data stored in a possessed item data table 221 of FIG. 9. Specifically, the number of virtual items possessed by the target virtual user is increased in accordance with the number of virtual items extracted by the item extracting section 41. For example, in a case where the target virtual user is a virtual user having user ID30001 and the item extracting section 41 has extracted two virtual items having item ID10001, the number of items of item ID10001 is changed from "2" to "4" in the possessed item data table 221 of FIG. 9.

(3-3-4) Configuration of the Registration Prompting Processing Section

A detailed configuration of the registration prompting processing section 113 will now be described. The registration prompting processing section 113 includes a prompting determining section 51, a prompting content determining section 52 and a registration prompting display outputting section 53.

The prompting determining section 51 is a section that determines whether or not the relevant virtual user is to be prompted to a new game based on the operation history information of the terminal which operates the virtual user and the ranking history information of the target virtual user by looking up the operation history data table 222 of FIG. 10 and the ranking history data table 223 of FIG. 11. For example, the prompting determining section 51 determines that the relevant virtual user is to be prompted to a new game in a case where at least one of the relative level value and the relative number of operations of the virtual user is decreasing between a predetermined previous time point and a current time point. Also, the prompting determining section 51 determines to prompt the relevant virtual user to a new game in a case where the number of operations of the target virtual user is greater than the average number of operations, and a varied value of the ranking-per-game of the target virtual user is less than or equal to a predetermined threshold between a predetermined previous time point and a current time point. The prompting determining section 51 may prompt to a new game if at least one of the relative level value and the relative number of operations of the target virtual user decreases in at least one game among a plurality of games for which the target virtual user is registered. Also, the prompting determining section 51 may prompt to a new game if the number of operations of the target virtual user is greater than the average number of operations and a varied value of the ranking-per-game of the virtual user is less than or equal to a predetermined threshold in at least one game among a plurality of games for which the target virtual user is registered.

The prompting content determining section 52 is a section that determines a content of the registration prompting image to be displayed on the terminal 3. The registration prompting image is an image for prompting the physical user operating the target virtual user to register for a new game. For example, the registration prompting image is an image displaying that something special can be obtained when registered for a new game.

The registration prompting display outputting section 53 is a section that transmits, in order to display the registration prompting image determined in the prompting content determining section 52, display process data related to the image to the terminal 3 via the Internet 2. Note that the registration prompting image may be displayed in all games or some of the games among a plurality of games for which the target virtual user is registered.

(3-3-5) Configuration of the Registration Management Section

A detailed configuration of the registration management section 114 will now be described. The registration management section 114 includes a registration request accepting section 61 and a user registration section 62.

The registration request accepting section 61 is a section that accepts, from the terminal 3, a request for registering the virtual user for a new game.

The user registration section 62 is a section that registers the virtual user for a new game in response to the registration request accepted by the registration request accepting section 61. When the virtual user is registered for a new game, the physical user operating the virtual user is allowed to play in the new game.

(4) PROCESS IN A GAME SERVER

(4-1) Overall Ranking Creating Process

Specific details of a process of creating an overall ranking in which rankings for a plurality of games are combined will be described with reference to FIG. 13.

Figure 13:
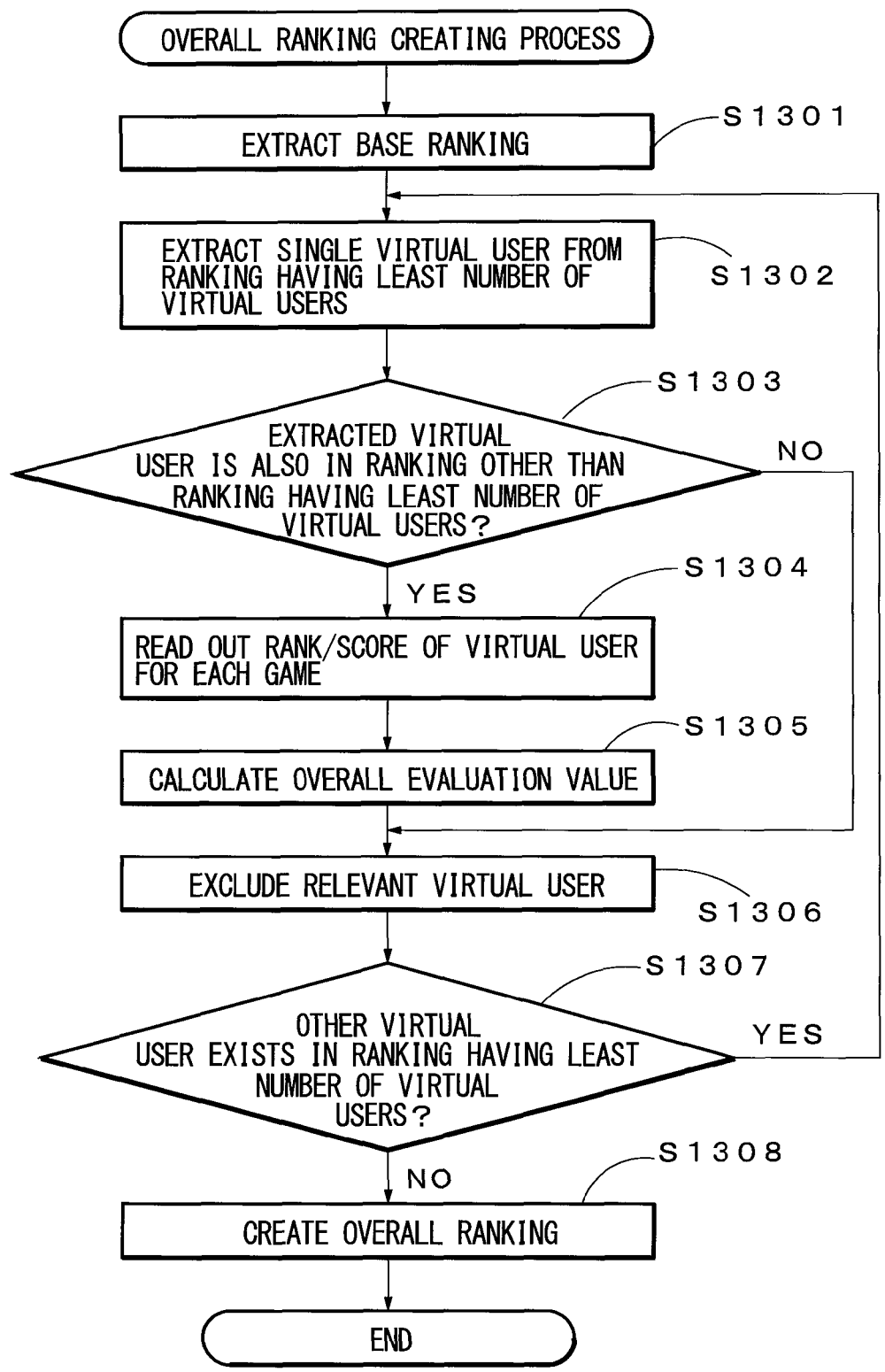
FIG. 13 is a diagram showing a specific procedure of a process carried out in an overall ranking creating section.

As seen in FIG. 13, in step S1301, an overall ranking creating section 111 extracts a ranking related to each of a plurality of games to be used as a basis for the overall ranking. For example, the overall ranking creating section 111 extracts rankings related to games A and B provided by a single game business provider. Examples of such base rankings are shown as the ranking-per-game data tables 212A and 212B in FIGS. 8A and 8B, respectively.

In step S1302, the overall ranking creating section 111 looks up the ranking-per-game data tables 212A and 212B of FIGS. 8A and 8B and extracts data of a single virtual user from a ranking having a least number of virtual users from among the rankings related to the plurality of games extracted in step S1301. For example, in a case where a number of virtual users of the ranking related to game A is 6329 which is shown as the last place in the ranking (see FIG. 8A), and a number of virtual users of the ranking related to game B is 28333 which is shown as the last place in the ranking (see FIG. 8B), the overall ranking creating section 111 firstly extracts a ranking related to game A. Then, the overall ranking creating section 111 extracts a virtual user of user ID 30001 which is a virtual user at the highest place in the ranking among the virtual users in the ranking related to game A.

In step S1303, the overall ranking creating section 111 looks up the ranking-per-game data tables 212A and 212B of FIGS. 8A and 8B and determines whether or not the virtual user extracted in step S1302 is in a ranking other than the ranking having the least number of virtual users among the rankings related to the plurality of games extracted in step S1301. In a case where the virtual user is in the ranking other than the ranking having the least number of virtual users (step S1303: YES), the process proceeds to step S1304, and in a case where the virtual user is not in the ranking other than the ranking having the least number of virtual users (step S1303: NO), the process proceeds to step S1306. Specifically, the overall ranking creating section 111 determines whether or not the virtual user of user ID 30001 appears in the ranking related to game B (FIG. 8B).

In step S1304, the overall ranking creating section 111 looks up the ranking-per-game data tables 212A and 212B of FIGS. 8A and 8B, respectively, and reads out a rank or a score of the target virtual user for each of the rankings related to the games extracted in step S1301. Specifically, the overall ranking creating section 111 reads out the rank or the score of the virtual user of user ID 30001 for the rankings related to games A and B, respectively.

In step S1305, the overall ranking creating section 111 calculates an overall evaluation value based on rank information or score information read out in step S1304. The details of the method of calculating the overall evaluation value will be described below.

In step S1306, the overall ranking creating section 111 excludes the virtual user extracted in step S1302.

In step S1307, the overall ranking creating section 111 looks up the ranking-per-game data tables 212A and 212B of FIGS. 8A and 8B and determines whether or not a virtual user other than the virtual user for which the above process was performed appears in the ranking having the least number of virtual users among the rankings related to the plurality of games extracted in step S1301. In a case where another virtual user does not exist (step S1307: NO), the process advances to step S1308, and in a case another virtual user exists (step S1307: YES), the process returns to step S1303, and repeats step S1302 and the subsequent steps.

In step S1308, the overall ranking creating section 111 arranges overall evaluation values of each virtual user calculated in step S1305 in a descending order. Thereby, the overall ranking is completed. For example, an AB overall ranking, such as the overall ranking data table of FIG. 12A, in which rankings related to games A and B are combined is created.

Hereinafter, the method of calculating the overall evaluation value in step S1305 will be described by dividing the method into a calculation method based on the rank information of the virtual user and a calculation method based on the score information of the virtual user.

(4-1-1) Method of Calculating an Overall Evaluation Value Based on Rank Information of the Virtual User The overall ranking creating section 111 specifically calculates the overall evaluation value by looking up the ranking-per-game data tables 212A and 212B of FIGS. 8A and 8B, converting the rank of the target virtual user into an individual evaluation value for each game, and thereafter accumulating the individual evaluation values.

Conversion from the rank to the individual evaluation value is carried out based on a predetermined conversion method. The individual evaluation value may be set for each of the ranks from the first place to the last place. However, in order to provide sense of superiority to the physical user operating the virtual user at a high rank in the ranking, it is preferable to set an individual evaluation value only for ranks of a predetermined threshold or above. For example, an individual evaluation value may be set to 10, 9, . . . , 1 for ranks from the first place to the tenth place and an individual evaluation value may be uniformly set to zero for any of the ranks of the eleventh place or below.

Accumulation of the individual evaluation values can be simply performed by adding the individual evaluation values of the respective games. For example, referring to the ranking-per-game data tables 212A and 212B of FIGS. 8A and 8B, the virtual user of user ID 30001 is ranked at the first place for game A and ranked at the eighth place for game B. Assuming that the individual evaluation value of game A is 10 and the individual evaluation value of game B is 3, the virtual user of user ID 30001 has an overall evaluation value of 13.

Note that the overall evaluation value may be calculated by setting a weighting factor in accordance with a number of virtual users appearing in each ranking and accumulating after multiplying the weighting factor with the individual evaluation value of each game. When weighting factors of the games A, B, . . . , N are a, b, . . . , n, respectively, the overall evaluation value is calculated as: (individual evaluation value of game A)×a+(individual evaluation value of game B)× b+ . . . +(individual evaluation value of game N)×n. For example, the weighting factor of ranks for which a number of virtual users is less than 10000 is 1.0, and the weighting factor of ranks for which a number of virtual users is greater than or equal to 10000 and less than 50000 is 1.2. Since the number of the virtual user of the ranking related to game A is 6329 and the number of the virtual user of the ranking related to game B is 28333, the virtual user of user ID30001 has an overall evaluation value of 13.6.

(4-1-2) Method of Calculating Overall Evaluation Value Based on Score Information of Virtual User The overall ranking creating section 111 calculates, specifically, the overall evaluation value by looking up the ranking-per-game data tables 212A and 212B of FIGS. 8A and 8B, respectively, by accumulating scores of the target virtual user for each game.

The accumulation of the scores is simply performed by adding up individual evaluation values of each game. For example, from the ranking-per-game data tables 212A and 212B of FIGS. 8A and 8B, it can be seen that for a virtual user having user ID 30001, the score of game A is 33000, the score of game B is 4800, and the overall evaluation value is 37800.

Note that a weighting factor may be set in accordance with a difference of a score collection period and a score increase efficiency for each of the games, and an overall evaluation value may be calculated by accumulation after having multiplied the score of each game by the weighting factor.

(4-2) Process in Item Managing Section and Registration Prompting Processing Section Next, details of an item grant process performed by the item managing section 112 and a registration prompting process performed by the registration prompting processing section 113 will be described separately for a first variant and a second variant. The first variant is a process of granting a virtual item to a virtual user triggered by the reception of predetermined operation data from the terminal. The second variant is a variant that is developed from the first variant. The second variant is a process of granting a virtual item to a virtual user triggered by having accepted a request for registration of the virtual user for a new game from the terminal through operation data. Also, in the second variant, the registration prompting process that prompts the virtual user to register for a new game is performed. Hereinafter, description will be made with reference to FIGS. 14 to 23.

(4-3) First Variant

As illustrated in FIG. 14, in step S1401, the operation data receiving section receives operation data from the terminal operating the virtual user. For example, the operation data includes operation data associated with game login or operation data associated with in-game communications between one virtual user and the other virtual user. When predetermined operation data is received from the terminal operated by the virtual user, the item managing section 112 grants a virtual item to the virtual user (step S1402). Details of a process of granting a virtual item to a virtual user (item grant process) will be described below.

(4-3-1) Item Granting Process

As illustrated in FIG. 15, in step S1501, the item extracting section 41 determines an overall ranking to be looked up when granting a virtual item to a target virtual user. The target virtual user as used herein is a virtual user operated by the terminal which has transmitted the predetermined operation data in step S1401.

In step S1502, the item extracting section 41 determines whether or not the target virtual user is in the overall ranking determined in step S1501. When it is in the overall ranking (step S1502: YES), the process proceeds to step S1503, and when it is not in the overall ranking (step S1502: NO), the process is terminated.

In step S1503, the item extracting section 41 extracts a virtual item to grant to a target virtual user based on the information on the overall ranking stored in the overall ranking data tables 231A and 231B of FIGS. 12A and 12B.

The number of virtual items to grant may be one or more. Note that, when the number of virtual items to grant is two or more, the virtual items may be a plurality of virtual items usable in a single game and may also be a plurality of virtual items usable in a plurality of games such as a combination of a virtual item usable in a first game and a virtual item usable in a second game. Details of the process of extracting a virtual item will be described below.

In step S1504, the item extracting section 41 produces a display image (item granting image) that displays a virtual item extracted in step S1503. The item granting image may include not only the virtual item but also the overall ranking of the target virtual user, etc. Particularly, in order to provide the physical user with an impression that the content of the virtual item to grant differs by the rank in the overall ranking, an image that associates the overall ranking with the virtual item is preferred.

In step S1505, the item display outputting section 42 transmits, to the terminal 3 via the Internet 2, image data for displaying the item granting image produced in step S1504.

In step S1506, the item setting section 43 updates data of a possessed item of the target virtual user and terminates the process. Specifically, the item setting section 43 performs a process of rewriting the number of corresponding virtual items in the possessed item data table 221 of FIG. 9.

(4-3-2) Process of Extracting a Virtual Item (Step S1503)

Referring to FIG. 16, a process of extracting a virtual item will be explained in detail.

As illustrated in FIG. 16, in step S1601, the item extracting section 41 looks up the overall ranking data tables 231A and 231B of FIGS. 12A and 12B and reads out total number of users related to the overall ranking determined in step S1501. The item extracting section 41 divides the ranking from first place to the last place into at least two segments, so that a first threshold, a second threshold ... are set in a descending order of the ranking. In a case where N thresholds are set, the number of segments is N+1. For example, from the overall ranking data table 231A of FIG. 12A, it is seen that the number of all users related to the AB overall ranking is 20. The item extracting section 41 divides 1st place to 20th place into four segments: 1st place, 2nd to 5th places, 6th to 10th places and 11th to 20th places.

In step S1602, the item extracting section 41 determines the game related to the virtual item to be granted to target virtual user. That is, the item extracting section 41 determines a virtual item usable in which game is to be granted to the target virtual user. The game may be one or more. Also, the game may be a game for which the target virtual user has already been registered, and may be a game for which the target virtual user is not yet registered.

In step S1603, the item extracting section 41 looks up the item data table 211 of FIG. 7 and determines the specific content of the virtual item to grant for each of the segments divided in step S1601.

The item extracting section 41 extracts a more valuable virtual item to be granted as the rank in the overall ranking becomes higher. The valuableness can be represented by differences in a function level or a quantity of the virtual item. That is, the virtual user at a higher rank in the overall ranking can obtain many virtual items having a more superior function. The virtual item having a more superior function is, for example, the one having a higher point recovery rate for the virtual item having the function of recovering the points, the one having a higher occurrence ratio of a high rarity virtual card for the virtual item having the function of granting the virtual cards, and the one having a high strengthening ratio for the virtual item having the function of increasing an ability value of the virtual card.

If the virtual user can obtain a battle item that has a high recovery rate for recovering the battle points consumed, even if all the battle points are consumed during a battle, it is possible to restart the battle immediately by using such a battle item. Also, if it is possible to obtain a gacha item that has a high occurrence ratio of a virtual card of a high rarity, the game can be progressed predominantly by consuming the gacha item to obtain a virtual card. Also, if it is possible to obtain a strengthening item that has a high strengthening ratio, an ability value can be drastically increased at once. For example, when a battle ability value that can be exerted in the battle with an enemy has increased, the virtual user can become strong in the battle part 23 as a response.

Specifically, the item extracting section 41 looks up the item data table 211 of FIG. 7 and determines to grant the virtual user at the first place in the overall ranking five quest items of point recovery rate 100% (item ID10001), the virtual users at the 2nd to 5th places in the overall ranking three quest items of point recovery rate 100% (item ID10001), the virtual users at the 6th to 10th places in the overall ranking three quest items of point recovery rate 25% (item ID10002), and the virtual users at the 11th to 20th places in the overall ranking one quest items of point recovery rate 25% (item ID10002).

In step S1604, the item extracting section 41 looks up the overall ranking data table 231A and 231B of FIGS. 12A and 12B and determines which of the segments divided in step S1601 the ranking of the target virtual user belongs to. The item extracting section 41 extracts a virtual item corresponding to the segment which target virtual user belongs to in accordance with the category of the virtual item determined in step S1603. For example, in the case of a virtual user having user ID30001, the item extracting section 41 extracts five virtual items having item ID10001 since the virtual user is ranked in first place in the AB overall ranking.

(4-3-3) Example of Screen Including an Item Granting Image

Referring now to FIGS. 17A, 17B and FIGS. 19A to 19C, an example of a screen including an item granting image will described.

FIG. 17A is a screen example to be displayed when a virtual item is granted to a target virtual user. At the top of the screen, for example, a display section 310 indicating "gift list" is displayed to notify that a virtual item is granted to the virtual user. Below the display section 310, an item granting image display section 320 that displays a specific content of the virtual item is displayed. Below the item granting image display section 320, a button icon 330 for accepting reception instruction of the virtual item from the virtual user is displayed that has an indication such as "receive now!". By operating the button icon 330 via the terminal, the virtual user can obtain the virtual item shown in the item granting image display section 320.

The item granting image display section 320a shown in FIG. 17B is an example of the item granting image display section 320 of FIG. 17A. The item granting image display section 320a includes a reward content display section 321 that displays that a virtual item is a reward to the operation performed by the physical user, a ranking display section 322 that displays an overall ranking of a virtual user, and an item display section 323 that displays the content of the virtual item to grant. For example, in the item granting image display section 320a, a reward to the operation performed by the physical user is displayed in the reward content display section 321 at an upper part, the overall ranking of the virtual user is displayed in the ranking display section 322 which is located below the reward content display section 321, a text indicating "YOU RECEIVE" is located below the ranking display section 322, and the content of the virtual item to grant is displayed in the item display section 323 which is located below the text.

Reward content display sections 321a to 321c shown in FIG. 19A is an example of the reward content display section 321 of FIG. 17B. For example, the reward content display section 321a displays, for example, "Reward for playing 50 consecutive days!" when granting a virtual item based on operation data indicating that a particular game is played every day consecutively for a predetermined period. The reward content display section 321b displays, for example, "Reward for commenting!" when granting a virtual item based on operation data indicating that a comment has been transmitted to the other virtual user. The reward content display section 321c displays, for example, "Reward for new registration!", which is an example in the second variant to be described below, when a virtual item is granted based on registration of a virtual user to a new game.

The ranking display sections 322a and 322b shown in FIG. 19B are an example of the ranking display section 322 of FIG. 17B. As long as a type of classification of the overall ranking and a rank of the target virtual user is displayed, the appearance and displaying manner of the ranking display section 322 is not particularly limited. For example, the ranking display section 322a comprises a text describing the type of the ranking and the ranking result of the user. Also, the ranking display section 322b comprises an image of a commendation good on the front surface of which the type of the ranking and the ranking result of the virtual user is indicated. Even though a trophy was illustrated as the ranking display section 322b as an exemplary image of a commendation good, note that it is not limited to a trophy and may also be a plaque, medals, or the like.

The item display sections 323a and 323b shown in FIG. 19C are examples of the item display section 323 of FIG. 17B. The item display section 323a comprises a text which indicates a game in which the virtual item to be granted is usable, the type of the virtual item to be granted, and a number of the virtual item to be granted. Also, similarly to the item display section 323b, the game and the virtual item may be displayed by an image by looking up the item data table 211 of FIG. 7.

(4-4) Second Variant (4-4-1) Item Granting Process with Registration Prompting Process As shown in FIG. 20, in step S2001, the registration prompting processing section 113 performs a process (registration prompting process) of prompting the physical user operating the virtual user to register the virtual user for a new game, and then proceeds to step S2002.

In step S2002, the registration request accepting section 61 determines whether or not there was a request for registering for a new game from the terminal. When there was a registration request (S2002: YES), the process proceeds to step S2003, and when there was no registration request (S2002: NO), the process of step S2002 is repeated until there is a registration request.

In step S2003, the user registration section 62 registers the virtual user associated with the terminal which has requested for registration in step S2002 for a new game.

In step S2004, the item managing section 112 performs a process (item granting process) of granting a virtual item based on the information on the overall ranking of the virtual user registered with a new game by looking up the overall ranking data tables 231A and 231B of FIGS. 12A and 12B.

The item grant process is performed in accordance with steps S1501 to 1506 of FIG. 15 similarly to an item grant process of the first variant. Also, the process of extracting a virtual item in step S1503 is performed in accordance with steps S1601 to 1604 in FIG. 16. Note that, in the second variant, in step S1602, the item extracting section 41 determines a game related to the virtual item to be granted to the target virtual user as the new game for which the virtual user was registered. In other words, in the second variant, a virtual item usable in a new game is granted to the virtual user registered with the new game. Also, as a screen example including the item granting image, the reward content display section 321c of FIG. 19A is displayed in the reward content display section 321 of FIG. 17B.

(4-4-2) Registration Prompting Process (step S2001)

Referring to FIG. 21, a process of prompting a physical user operating a virtual user to register the virtual user for a new game will be explained in detail.

As shown in FIG. 21, in step S2101, the prompting determining section 51 performs a process (prompting determining process) of determining whether or not the timing is right to prompt a certain virtual user to a new game.

In step S2102, when it is determined in step S2101 that it is a timing to prompt a certain virtual user to a new game (step S2102: YES), the prompting determining section 51 proceeds to step S2103. On the other hand, when it is not determined as a prompting timing (step S2102: NO), the process returns to step S2101, and the process of step S2101 is repeated until it is determined to be a timing for the prompting determining section 51 to prompt.

In step S2103, the prompting content determining section 52 performs a process of determining a new game whereto the certain virtual user is to be prompted. The new game may be selected from any game for which the certain virtual user is not registered. Specifically, the prompting content determining section 52 reads out all game that can be provided to the terminal from the game data storing sections 210a to 210n. Also, the prompting content determining section 52 reads out a game for which the certain virtual user is registered with from the virtual user data storing section 220. The game for which the certain virtual user is not registered can be extracted by comparing all the games read out and the game with which the certain virtual user is registered.

In step S2104, the prompting content determining section 52 generates a display image (registration prompting image) that displays a benefit which is obtained when the virtual user is registered with a new game, in order to prompt the certain virtual user to a new game. The registration prompting image is, for example, an image that displays that a virtual item is granted to the virtual user when the certain virtual user is registered for a new game.

In step S2105, the registration prompting display outputting section 53 transmits, to the terminal 3 connected to Internet 2, the image data for displaying registration prompting image formed in step S2104.

(4-4-3) Prompting Determining Process (step S2101)

Specific Example 1

Figure 22:
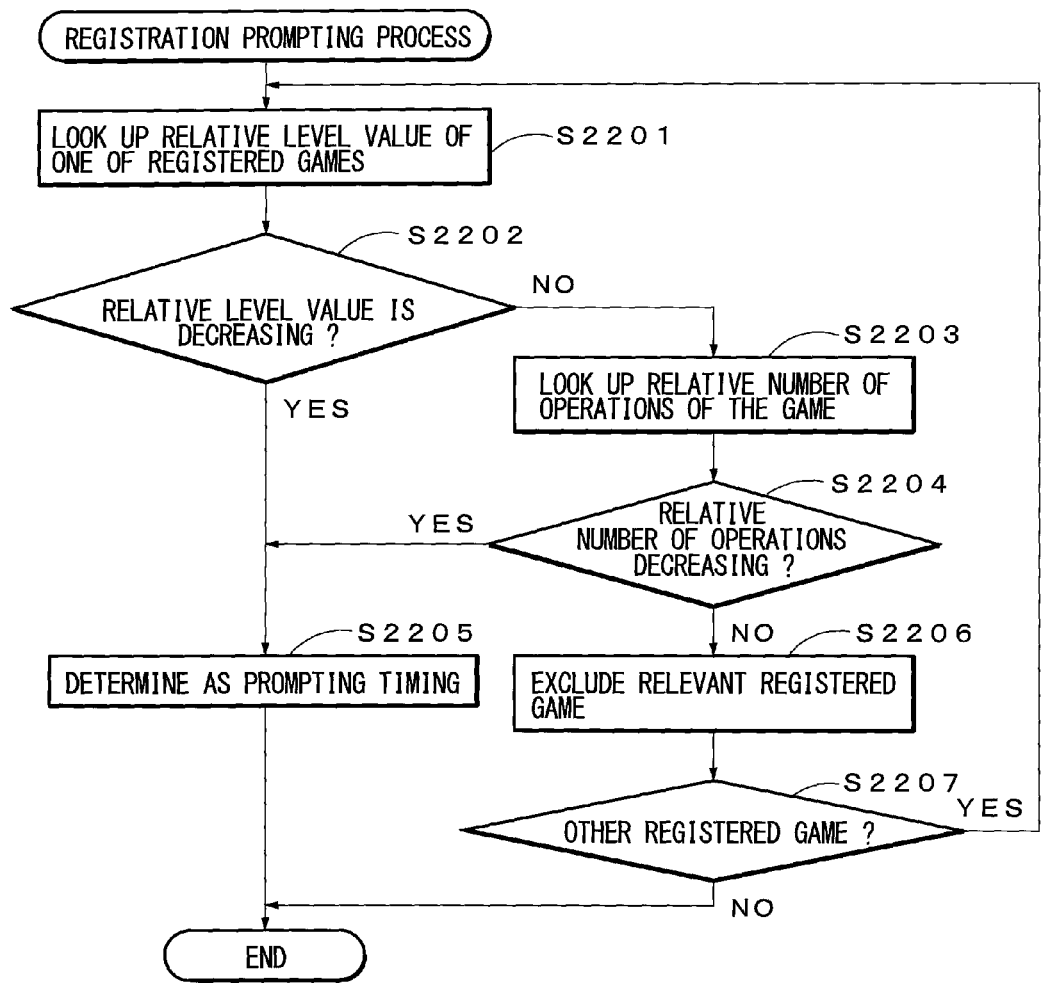
FIG. 22 is a diagram showing a specific procedure of a process carried out in the prompting determining section.

Details of a process (prompting determining process) of determining whether or not it is a timing to prompt a certain virtual user to a new game, which is a process of step S2101 of FIG. 21, is shown in FIG. 22. As shown in FIG. 22, in step S2201, the prompting determining section 51 reads out relative level value information of one of the games selected from among the games which the certain virtual user is registered by looking up the operation history data table 222 of FIG. 10, and proceeds to step S2202.

In step S2202, the prompting determining section 51 determines whether or not a relative level value of the target virtual user has decreased between a predetermined previous time point and a current time point. In step S2202, when it is determined that the relative level value has decreased (S2202: YES), it proceeds to step S2205, and determines that it is a timing to prompt the target virtual user to a new game, and terminates the process (END). On the other hand, in step S2202, when it is determined that the relative level value has not decreased (S2202: NO), the process proceeds to step S2203.

Determination of whether or not the relative level value has decreases is performed, for example, by comparing an average value of the relative level values between a predetermined previous time point and a current time point (near past period) and an average value of the relative level values between a further past previous time point and the predetermined previous time point (far past period). When the average value of the relative level values in the near past period is smaller than the average value of the relative level values in the far past period, the prompting determining section 51 determines that the relative level value has decreased. For example, using the operation history data table 222 of FIG. 10, in game A where the virtual user of user ID30001 is registered, the prompting determining section 51 compares an average value of relative level values from September 1 to September 4 with an average value of relative level values from September 4 to September 7 (present). The average value of the relative level values from September 1 to September 4 is 10 and the average value of the relative level values from September 4 to September 7 (present) is 11. In this case, the prompting determining section 51 determines that the relative level value has not decreased. Also, in game B where virtual user of user ID30001 is registered, an average value of relative level values from September 1 to September 4 is compared with an average value of relative levels values from September 4 to September 7 (present). The average value of the relative level values from September 1 to September 4 is 18 and the average value of the relative level values from September 4 to September 7 (present) is 16. In this case, the prompting determining section 51 determines that the relative level value has decreased.

The determination of whether or not a relative level value has decreased may be performed by comparing a relative level value of the first day the virtual user was registered with the current relative level value. When an amount of decrease of the current relative level value with respect to the relative level value of the first day is greater than a predetermined threshold, the prompting determining section 51 determines that the relative level value has decreased. For example, using the operation history data table 222 of FIG. 10, in game A where virtual user of user ID30001 is registered, the prompting determining section 51 compares the relative level value of April 1 (the first day) with the relative level value of September 7 (present). The relative level value of April 1 (the first day) is 10 and the relative level value of September 7 (present) is 8. Thus, the amount of decrease of the current relative level value with respect to the relative level value of the first day is 2. When the predetermined threshold is 3, the prompting determining section 51 determines that the relative level value has not decreased. In game B for which the virtual user of user ID30001 is registered, the relative level value of June 1 (the first day) is compared with the relative level value of September 7 (present). The relative level value of June 1 (the first day) is 23 and the relative level value of September 7 (present) is 16. Thus, the amount of decrease of the current relative level value with respect to the relative level value of the first day is 7. When the predetermined threshold is 3, the prompting determining section 51 determines that the relative level value has decreased.

The determination of whether or not the relative level value has decreased may be performed by deriving a regression equation by using the least squares method for the relative level values between a predetermined previous time point and a current time point. The prompting determining section 51 refers to the derived regression equation and, when a regression coefficient is negative, determines that the relative level value has decreased.

In step S2203, the prompting determining section 51 looks up the operation history data table 222 of FIG. 10 and reads out relative number of operation information of one of the games arbitrarily selected in step S2201, and the process proceeds to step S2204.

In step S2204, the prompting determining section 51 is determines whether the relative number of operations of the target virtual user has decreased between a predetermined previous time point and a current time point. In step S2204, when it is determined that the relative number of operations has decreased (S2204: YES), the process proceeds to step S2205, and it is determined that it is a timing for prompting a certain virtual user to a new game, and terminates this process (END). On the other hand, in step S2204, when it is determined that the relative number of operations has not decreased (S2204: NO), the process proceeds to step S2206. The determination of whether the relative number of operations has decrease can be performed by a method similar to the determination in step S2202 of whether or not the relative level value has decreased.

In step S2206, the prompting determining section 51 excludes the relevant one of the games selected from the determination target.

In step S2207, the prompting determining section 51 looks up the operation history data table 222 of FIG. 10 and determines whether or not there is another game for which the certain virtual user is registered. When another game does not exist (S2207: NO), the prompting determining section 51 determines that it is not a timing to prompt the certain virtual user to a new game, and the process is terminated (END). On the other hand, when another game exists (S2207: YES), the process returns to step S2201 and repeats the processes of step S2201 and subsequent steps.

As has been described above, the prompting determining section 51 determines that the virtual user is prompted to a new game when at least one of the relative level value of the certain virtual user and the relative number of operations has decreased.

When the relative level value of the virtual user is decreasing, it can be considered that the physical user is not performing an operation to increase the level value at all or not much and in a condition of getting bored of the game. When the relative level value of the virtual user is increasing or has not changed but the relative number of operations is decreasing, it can be considered that the physical user is performing minimum operation for increasing the level value and the degree of enthusiasm for the game is decreasing. When the relative level value of the virtual user and the relative number of operations are both increasing or has not changed, it can be considered that the physical user is enthusiastic for the game. The prompting determining process is a process of determining a physical user whose degree of enthusiasm for the game is decreasing or a physical user who is bored of the game.

Specific Example 2

Figure 23:
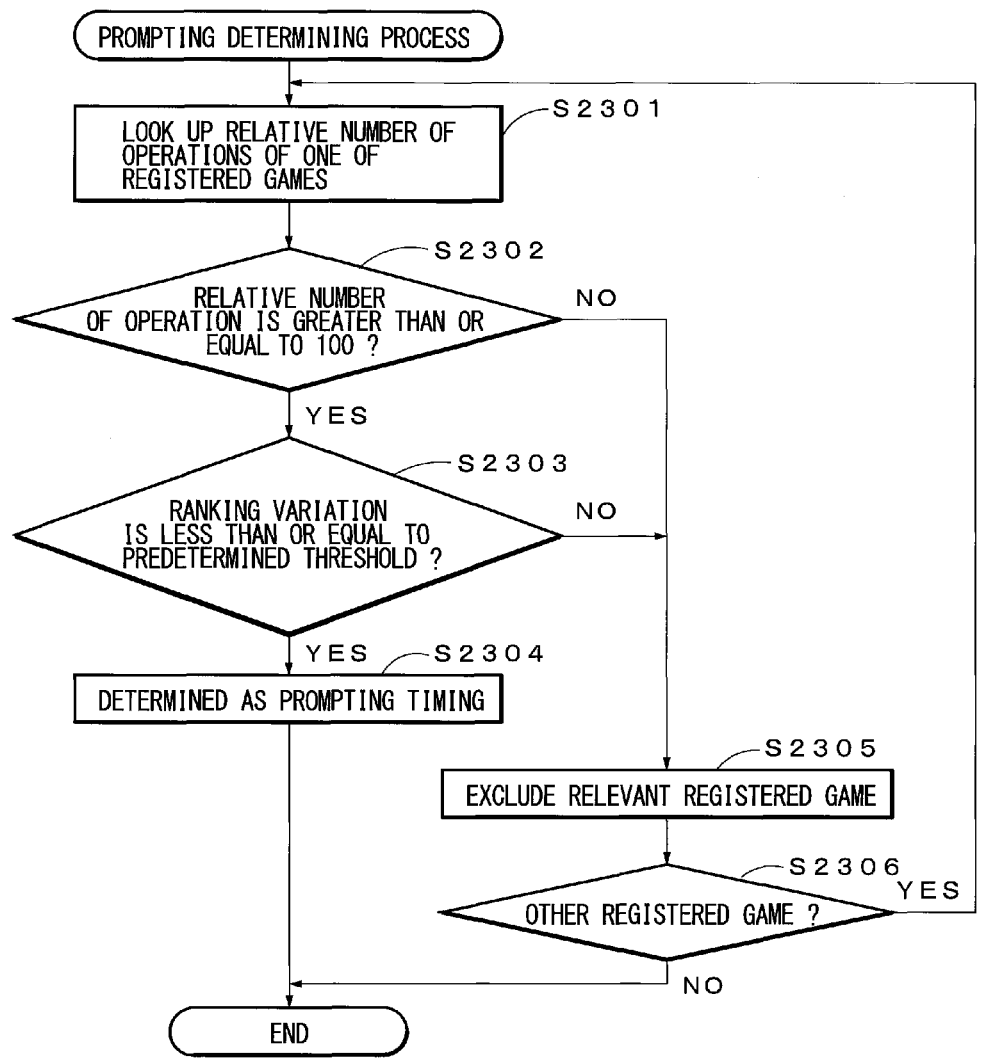
FIG. 23 is a diagram showing a specific procedure of a process carried out in a prompting determining section.

Details of a process (prompting determining process) of determining whether or not it is a timing to prompt a certain virtual user to a new game which is a process of step S2101 of FIG. 21 is shown in FIG. 23. As shown in FIG. 23, in step S2301, the prompting determining section 51 looks up the operation history data table 222 of FIG. 10 and reads out a relative number of operations of one of the games selected from among the games for which the certain virtual user is registered, and proceeds to step S2302.

In step S2302, the prompting determining section 51 determines whether or not the relative number of operations of the certain virtual user is greater than or equal to 100 between a predetermined previous time point and a current time point. That is, it is determined whether or not the number of operations of the certain virtual user is greater than an average number of operations of active users in one of the games arbitrarily selected in step S2301. When it is determined that the relative number of operations is greater than or equal to 100 (step S2302: YES), the process proceeds to step S2303; when it is determined that the relative number of operations is less than 100 (step S2302: NO), the process proceeds to step S2305. The condition that the relative number of operations is greater than or equal to 100 may be applied for all days between a predetermined previous time point and a current time point, or, the condition that the relative number of operations is greater than or equal to 100 may be applied for a predetermined ratio or more between a predetermined previous time point and a current time point.

In step S2303, the prompting determining section 51 looks up the ranking history data table 223 of FIG. 11 and determines whether or not a value of variation of the rank of the certain virtual user is less than or equal to a predetermined threshold between a predetermined previous time point and a current time point. Specifically, the prompting determining section 51 extracts the best rank and the worst rank of the virtual user between a predetermined previous time point and a current time point and determines whether or not a difference between the best rank and the worst rank is less than or equal to a predetermined threshold. When it is determined that the value of variation of the rank is less than or equal to the predetermined threshold (step S2303: YES), the process proceeds to step S2304 and determines that it is a timing to prompt the certain virtual user to a new game and terminates this process (END). On the other hand, when it is determined that the value of variation in the rank is less than or equal to the predetermined threshold (step S2303: NO), the process proceeds to step S2305.

In step S2305, the prompting determining section 51 excludes the one of the games selected from the determination targets.

In step S2306, the prompting determining section 51 looks up the operation history data table 222 of FIG. 10 and determines whether there is another game for which the target virtual user is registered. When another game does not exist (S2306: NO), the prompting determining section 51 determines that it is not a timing to prompt the certain virtual user to a new game, and the process is terminated (END). On the other hand, when another game exists (S2306: YES), the process returns to step S2301 and repeats the processes of step S2301 and the subsequent steps.

As has been described above, the prompting determining section 51 determines that the virtual user is prompted to a new game when relative number of operations of the virtual user is greater than or equal to 100, and the value of variation in the rank per game is less than or equal to a predetermined threshold.

When the relative number of operations of the target virtual user is greater than or equal to 100, it can be considered that the physical user is enthusiastic in the game. However, if the rank does not change so much despite the fact that the physical user is playing the game enthusiastically, a pleasure in playing the game to raise the rank is not obtained. Therefore, it is expected that the physical user gradually gets bored of the game. The prompting determining process is a process of determining a physical user who is nearly bored of the game.

(4-4-4) Screen Example Including the Registration Prompting Image

Referring now to FIGS. 18A, 18B, 19A, 19B and 19C, a screen example including the registration prompting image will be described.

Figures 18A, 18B:
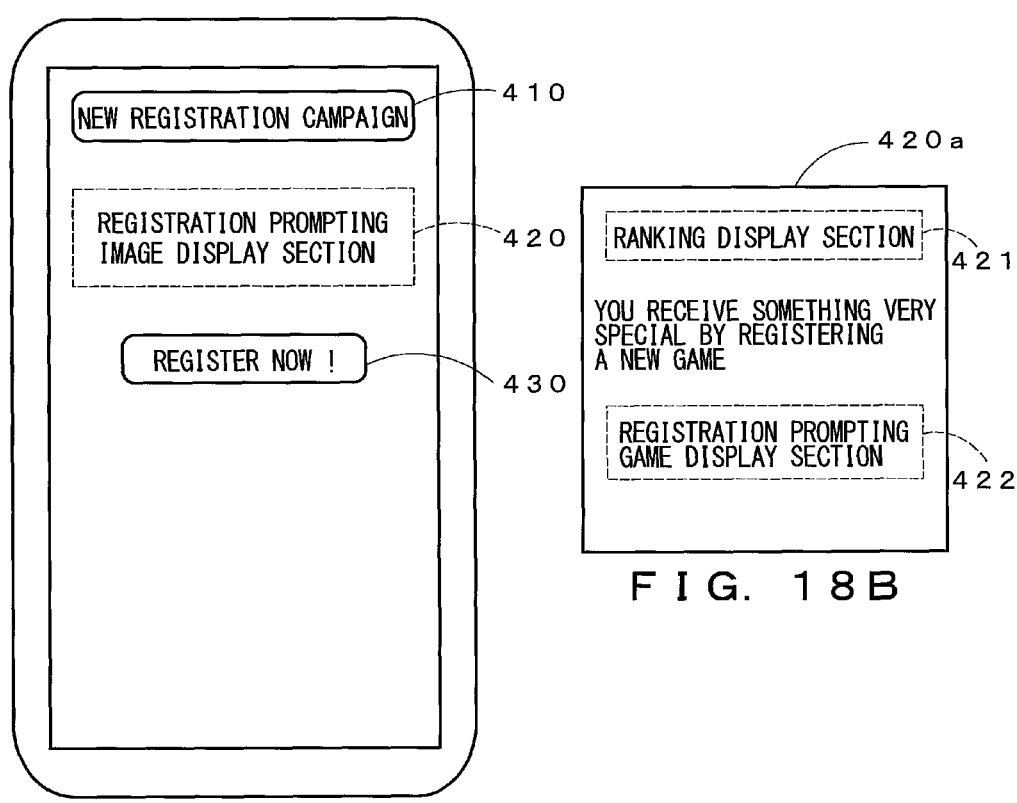
FIGS. 18A and 18B are diagrams for explaining a display example of a registration prompting image.

FIG. 18A is a screen example which is displayed when prompting a physical user to register for a new game. At the top of the screen, for example, a display section 410 indicating "new registration campaign" is displayed to notify a physical user that it is a good deal to register for a new game. Below the display section 410, a registration prompting image display section 420 that displays a benefit which is obtained when a new game is registered. Below the registration prompting image display section 420, a registration accepting button icon 430 comprising an indication "registered now!" is displayed for accepting registration for a new game from the physical user.

The registration prompting image display section 420a shown in FIG. 18B is an example of the registration prompting image display section 420 of FIG. 18A. The registration prompting image display section 420a includes a ranking display section 421 displaying an overall ranking of the virtual user and a registration prompting game display section 422 displaying a game to be suggested to the physical user for registration. In the registration prompting image display section 420a, for example, "Your ranking result is . . . You receive something very special by registering a new game, game A" is displayed. Ranking display sections 421a and 421b shown in FIG. 19B are examples of the ranking display section 421 of FIG. 18B.

(5) EFFECT

According to the present embodiment described above, when predetermined operation data is received from the terminal, the item extracting section extracts a virtual item based on information on the overall ranking of the target virtual user. In the present embodiment, the target virtual user can obtain many virtual items having a better function as the overall ranking becomes higher. It is possible to give the physical user the motivation to increase the rank in the overall ranking and can increase willingness to play a game.

A ranking is an index that represents strength of the virtual user in a game and being ranked at a high rank in the ranking is a proof of the strength. Therefore, if the physical user can be ranked at a high position in the ranking-per-game and also ranked at a high position in the overall ranking in which a plurality of ranking-per-game are combined, he/she can further show off his/her strength. Therefore, an existence of the overall ranking can increase willingness to play the game of, particularly, a skilled user who aims to be ranked at the highest place in the ranking.

In the present embodiment, in the first variant, the item extracting section can extract a virtual item usable in the game for which target virtual user has been already registered. For the physical user operating the target virtual user, it is possible to improve motivation to continue the game which the physical user is currently playing.

In the present embodiment, in the second variant, when virtual user is registered for a new game, the item extracting section extracts a virtual item usable in the new game. The target virtual user can obtain a virtual item when starting the new game. Particularly, a virtual user who is at a higher rank in the overall ranking can obtain many virtual items having a superior function when starting a new game. The physical user operating such a virtual user can play the game dominantly from an initial phase by using the virtual item. If a physical user operating a virtual user is ranked high in the overall ranking, it is possible to make the physical user realize a benefit to play a game dominantly from an initial phase. Accordingly, it is possible to make the physical user recognize that, if the virtual user can be ranked high in the overall ranking by intensively playing a game which the physical user has newly started to play, he/she will have an advantage in a next new game. Thereby, it is possible to increase willingness to compete for being ranked high in the overall ranking and can increase willingness to play the game.

In the present embodiment, the item granting image display section 320a includes the reward content display section 321 and the item display section 323. The item granting image display section 320a is a display section that associates a virtual item that the virtual user can obtain with a predetermined operation performed by the physical user. Thereby, it is possible to make the physical user recognize that a virtual item can be obtained if a predetermined operation is performed. In this way, it is possible to encourage the physical user to perform the predetermined operation linked to the obtainment of the virtual item and to increase the willingness to play the game.

In the present embodiment, the item granting image display section 320a includes the ranking display section 322 and the item display section 323. The item granting image display section 320a is a display section that associates the virtual item that the virtual user can obtain with the overall ranking of the virtual user. Thereby, it is possible to make the physical user recognize that a valuable virtual item can be obtained if ranked high in the overall ranking. It is possible to increase willingness to compete for a high rank in the overall ranking and to increase willingness to play the game.

In the present embodiment, the prompting determining section 51 determines to prompt the virtual user for a new game when at least one of the relative level value of a certain virtual user and the relative number of operations has decreased. When the relative level value of the virtual user is decreasing, it can be considered that the physical user is not performing an operation of increasing a level value at all or not much and in a condition of getting bored of the game. When the relative level value of the virtual user is increasing or has not changed but the relative number of operations is decreasing, it can be considered that the physical user is performing minimum operation to increase the level value and the degree of enthusiasm for the game is decreasing. When the relative level value of the virtual user and the relative number of operations are both increasing or has not changed, it can be considered that the physical user is enthusiastic about the game. In the present embodiment, it is possible to encourage registration to a new game by suggesting registration for a new game to a physical user whose degree of enthusiasm in the game is decreasing or a physical user who is bored of the game.

In the present embodiment, the prompting determining section 51 determines that the virtual user is prompted to a new game when relative number of operations of the virtual user is greater than or equal to 100, and the value of variation in the ranking-per-game is less than or equal to a predetermined threshold. When the relative number of operations of the target virtual user is greater than or equal to 100, it can be considered that the physical user is enthusiastic about the game. However, if the rank does not change so much despite the fact that the physical user is playing the game enthusiastically, a pleasure in playing the game to raise the rank is not obtained. Accordingly, it is expected that the physical user gradually gets bored of the game. It is considered that the physical user is in a state where his willingness to play the game will soon decrease. In the present embodiment, by suggesting registration for new game to a physical user whose willingness to play the game will soon decrease, it is possible to prompt to a new game while maintaining motivation to play the game.

In the present embodiment, an indication indicating that something special can be obtained when registered for a new game is displayed on the registration prompting image display section 420a. It is possible to make the physical user realize that it is a good deal to register for a new game. The registration prompting image display section 420a includes the ranking display section 421 that displays the overall ranking of the virtual user. It is possible to make the physical user recognize that something special which is obtained in the new game is related to the overall ranking. In other words, it is possible to make the physical user recognize that not anyone can obtain something special that is obtained in the new game but only a virtual user who is ranked in the overall ranking can obtain it. The physical user has an impression that himself or herself is being given special treatment. Thereby, registration to a new game can be promoted.

It is to be understood that the object of the present disclosure may also be accomplished by supplying a system or apparatus with a non-transitory storage medium in which a software program, which executes the functions of the above described embodiment, is stored and causing a computer (or CPU or MPU) of the system or apparatus to read out and execute the software program stored in the non-transitory storage medium.

In the above case, the software program read from the non-transitory storage medium executes the functions of the above described embodiment, and therefore the software program and the non-transitory storage medium in which the software program is stored are also an embodiment of the present disclosure.

Examples of the non-transitory storage medium for supplying the software program include a flexible disk, a hard disk, a magneto-optical disk, an optical disk such as a CD-ROM, a CD-R, a CD-RW, a DVD-ROM, a DVD-RAM, a DVD-RW and a DVD+RW, a magnetic tape, a nonvolatile memory card, and a ROM. Alternatively, the program may be downloaded via a network.

Further, it is to be understood that the functions of the above described embodiment may be accomplished not only by executing the software program read out by a computer, but also by causing an OS (operating system) or the like which operates on the computer to perform a part or all of the actual operations based on instructions of the software program.

Further, it is to be understood that functions of the above described embodiment may be accomplished by writing a software program read out from the non-transitory storage medium into a memory provided on an expansion board inserted into a computer or a memory provided in an expansion unit connected to the computer and then causing a CPU or the like provided in the expansion board or the expansion unit to perform a part or all of the actual operations based on instructions of the software program.

While the present disclosure has been described with reference to exemplary embodiments, it is to be understood that the present disclosure is not limited to the disclosed exemplary embodiments. The scope of the following claims is to be afforded the broadest interpretation so as to encompass all such modifications and equivalent structures and functions.

What is claimed is:

1. A game server comprising:
   an operation data receiving section that receives, from a terminal whereto a plurality of kinds of games is provided via a communication network, operation data for operating a virtual user created in a virtual space;
   an overall ranking creating section that creates an overall ranking based on ranking-per-game information related to at least two of the plurality of kinds of games stored in a storing section;
   an item extracting section that extracts a virtual item stored in a storing section and usable in a specific game, based on information on the overall ranking upon reception of predetermined operation data from the terminal; and
   an item setting section that sets an extracted virtual item as a virtual item possessed by the virtual user.

2. The game server according to claim 1, further comprising:
   a registration request accepting section that accepts a request for registering a virtual user for a new game based on the operation data; and
   a user registration section that registers the virtual user for the new game in response to the request,
   wherein, after the user registration section has registered the virtual user, the item extracting section extracts a virtual item usable in the new game based on the information on the overall ranking.

3. The game server according to claim 2, further comprising:
   a registration prompting display outputting section that displays, in a game for which the virtual user is registered, a prompt for registration for a new game; and
   a prompting determining section that determines whether or not to display the prompt based on operation history information of the terminal operating the virtual user,
   wherein the prompting determining section determines to display the prompt in a case where, between a predetermined previous time point and a current time point, at least one of an experience value and a number of operations of the virtual user is decreasing with respect to an average experience value and an average number of operations in a game for which the virtual user is registered.

4. The game server according to claim 2, further comprising:
   a registration prompting display outputting section that displays, in a game for which the virtual user is registered, a prompt for registration for a new game; and
   a prompting determining section that determines whether or not to display the prompt based on operation history information of the terminal operating the virtual user and ranking-per-game history information of the virtual user,
   wherein the prompting determining section determines to display the prompt in a case where, between a predetermined previous time point and a current time point, a number of operations from the terminal operating the virtual user is greater than an average number of operations in the game for which the virtual user is registered and a value of variation in the ranking-per-game of the virtual user is less than or equal to a predetermined threshold.

5. The game server according to claim 1, wherein the plurality of kinds of games is one of a plurality of games provided by a single game provider, a plurality of games of a single genre, and a plurality of games among which a minimum charging amount required for purchasing a virtual item is the same.

6. A game controlling method of executing a process by a computer connected to a communication network, the process comprising:
   receiving, from a terminal whereto a plurality of kinds of games is provided via a communication network, operation data indicative of operations performed on the terminal for operating a virtual user created in a virtual space;
   creating an overall ranking by a processor based on ranking-per-game information related to at least two of the plurality of kinds of games stored in a storing section;
   extracting a virtual item stored in a storing section, the virtual item usable in a specific game, based on information on the overall ranking upon reception of predetermined operation data from the terminal; and
   setting an extracted virtual item as a virtual item possessed by the virtual user.

7. A non-transitory computer-readable medium storing a game program for causing a computer connected to a communication network to implement the functions of:
   receiving, from a terminal whereto a plurality of kinds of games is provided via a communication network, operation data for operating a virtual user created in a virtual space;
   creating an overall ranking based on ranking-per-game information related to at least two of the plurality of kinds of games stored in a storing section;
   an item extracting section that extracts a virtual item stored in a storing section and usable in a specific game, based on information on the overall ranking upon reception of predetermined operation data from the terminal; and
   setting an extracted virtual item as a virtual item possessed by the virtual user.

8. A game system comprising:
   a game server; and
   at least one terminal connected to the game server via a communication network,
   the game server including:
   an operation data receiving section that receives, from a terminal whereto a plurality of kinds of games is provided via a communication network, operation data for operating a virtual user created in a virtual space;
   an overall ranking creating section that creates an overall ranking based on ranking-per-game information related to at least two of the plurality of kinds of games stored in a storing section;
   an item extracting section that extracts a virtual item stored in a storing section and usable in a specific game, based on information on the overall ranking upon reception of predetermined operation data from the terminal; and
   an item setting section that sets an extracted virtual item as a virtual item possessed by the virtual user,
   the terminal including an operation input section that accepts the operation data.

* * * * *